US010692411B2

(12) United States Patent
Kim et al.

(10) Patent No.: US 10,692,411 B2
(45) Date of Patent: Jun. 23, 2020

(54) DISPLAY DEVICE, TEST CIRCUIT, AND TEST METHOD THEREOF

(71) Applicant: LG Display Co., Ltd., Seoul (KR)

(72) Inventors: Beom-Jin Kim, Seoul (KR); Sunkyung Shin, Gyeonggi-do (KR); Bongchoon Kwak, Seoul (KR); Sojung Jung, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/224,324

(22) Filed: Dec. 18, 2018

(65) Prior Publication Data

US 2019/0197930 A1 Jun. 27, 2019

(30) Foreign Application Priority Data

Dec. 21, 2017 (KR) ........................ 10-2017-0177182
Nov. 19, 2018 (KR) ........................ 10-2018-0142990

(51) Int. Cl.

| | |
|---|---|
| ***G06F 3/038*** | (2013.01) |
| ***G09G 3/00*** | (2006.01) |
| ***G09G 3/3275*** | (2016.01) |
| ***G09G 3/3266*** | (2016.01) |
| ***G09G 3/3233*** | (2016.01) |

(52) U.S. Cl.
CPC ........... *G09G 3/006* (2013.01); *G09G 3/3233* (2013.01); *G09G 3/3266* (2013.01); *G09G 3/3275* (2013.01); *G09G 2300/0842* (2013.01); *G09G 2310/0251* (2013.01)

(58) Field of Classification Search
None
See application file for complete search history.

(56) References Cited

U.S. PATENT DOCUMENTS

2013/0328846 A1* 12/2013 Jamal .................... G06F 1/3265 345/211

* cited by examiner

*Primary Examiner* — Carl Adams
(74) *Attorney, Agent, or Firm* — Seed IP Law Group LLP

(57) ABSTRACT

The embodiments of the present disclosure relate to a display device, a test circuit, and a test method thereof. More specifically, a display device may include a silicon substrate having a plurality of gate lines, a plurality of data lines, a plurality of sensing lines, and a pixel array on which a plurality of subpixels are arranged; a test circuit arranged on the silicon substrate, the test circuit configured to select at least one line of the plurality of data lines or the plurality of sensing lines, to convert a signal transmitted through the selected line into a digital signal, and to output test data; and a test pad unit configured to output the test data to a circuit outside the silicon substrate.

17 Claims, 15 Drawing Sheets

DISPLAY DEVICE, TEST CIRCUIT, AND TEST METHOD THEREOF

CROSS REFERENCE TO RELATED APPLICATION

This application claims priority from Korean Patent Application No. 10-2017-0177182, filed Dec. 21, 2017, and Korean Patent Application No. 10-2018-0142990, filed Nov. 19, 2018, which are hereby incorporated by reference for all purposes as if fully set forth herein.

BACKGROUND

Technical Field

The present disclosure relates to a display device, a test circuit, and a test method thereof.

Description of the Related Art

A display device includes various display circuits such as a display panel in which a plurality of subpixels are arranged, and a source driving circuit and a gate driving circuit for driving the display panel.

In a conventional display device, transistors, various electrodes, various signal lines, and the like are provided on a glass substrate, driving circuits that can be implemented as an integrated circuit are mounted on a printed circuit, and a display panel is electrically connected to the driving circuits through the printed circuit.

Such an existing structure is suitable for a large display device, but is not suitable for a small display device.

Meanwhile, a variety of electronic devices which require small display devices, such as a virtual reality device, an augmented reality device, and the like are emerging. Thus, a display device having a very small size has been proposed. Such a device can be called a microdisplay device.

Since a microdisplay device is formed as a semiconductor chip in the form of an integrated circuit (IC) on a silicon substrate (silicon semiconductor substrate), it is very difficult to visually discriminate the defects of the microdisplay device. In many cases, various driving circuits as well as a pixel array are integrally implemented.

Accordingly, there is a need for a method of testing a microdisplay device implemented in a different form from a conventional display device.

Since the microdisplay device is formed as a semiconductor chip on a silicon substrate, the size of the semiconductor chip increases along with an increase in the size of the microdisplay device and thereby the yield is greatly reduced.

Therefore, there is a demand for a method of testing a microdisplay device having only a small size increase of the semiconductor chip due to the testing circuit being included on the semiconductor chip.

BRIEF SUMMARY

In this background, an aspect of the present disclosure is to provide a display device, a test circuit, and a test method thereof that may enable high-speed accurate testing. This display device can also be referred to as a microdisplay.

Another aspect of the present disclosure is to provide a display device, a test circuit, and a test method thereof that may enable testing while only a small increase in size.

Still another aspect of the present disclosure is to provide a display device, a test circuit, and a test method thereof that may increase the yield and reduce cost.

Yet another aspect of the present disclosure is to provide a display device, a test circuit, and a test method thereof that may enable external compensation.

In accordance with an aspect of the present disclosure, there is provided a display device including: a silicon substrate having a plurality of gate lines, a plurality of data lines, a plurality of sensing lines, and a pixel array on which a plurality of subpixels are arranged; a test circuit arranged on the silicon substrate, test circuit configured to select at least one line of the plurality of data lines or the plurality of sensing lines, to convert a signal transmitted through the selected line into a digital signal, and to output test data; and a test pad unit configured to output the test data to a circuit outside the silicon substrate.

The test circuit may include a first test multiplexer configured to select one of the plurality of data lines or the plurality of sensing lines according to a test mode, a second test multiplexer configured to select at least one line of the plurality of data lines or plurality of sensing lines selected by the first test multiplexer; and a test converter configured to convert a signal received through the line selected by the second test multiplexer into a digital signal and to output the test data having a predetermined number of bits.

The second test multiplexer may sequentially change and select at least one line of the plurality of data lines or plurality of sensing lines selected by the first test multiplexer.

The test converter may further include an analog-to-digital converter, and a signal converter configured to be arranged between the second test multiplexer and the analog-to-digital converter and to convert, when a signal output from the second test multiplexer is a current signal, the current signal into a voltage signal to output the converted result to the analog-to-digital converter.

The signal converter may include a current-voltage converter configured to detect a current of the signal output from the second test multiplexer and to convert the detected current into a corresponding voltage signal, and a third test multiplexer configured to output, when a mode designated by a test mode signal is a sensing test mode, an output of the current-voltage converter to the analog-to-digital converter, and to output, when the mode designated by the test mode signal is a data test mode, an output of the second test multiplexer to the analog-to-digital converter.

The test pad unit may include the same number of test pads as the number of bits of the test data, and a reference pad configured to be applied with a data reference voltage of the analog-to-digital converter from an external device.

The microdisplay device may further include: a driving circuit configured to be arranged on a circuit zone, wherein the driving circuit includes at least one gate driving circuit configured to be arranged in a first direction in which the plurality of gate lines of the pixel array extend and to drive the plurality of gate lines, at least one source driving circuit configured to be arranged in a second direction in which the plurality of data lines of the pixel array extend and to drive the plurality of data lines, and a controller configured to control the at least one gate driving circuit, the at least one source driving circuit, and the test circuit.

The test circuit may be arranged in a margin area in which the at least one gate driving circuit and the at least one source driving circuit are not be arranged in a periphery of the pixel array.

The microdisplay device may further include: an input/output pad unit configured to receive input image data from an external device and to transmit the received input image data to the controller.

The test pad unit may be arranged adjacent to the input/output pad unit.

The first test multiplexer may be arranged inside the at least one source driving circuit.

The second test multiplexer and the test converter may be arranged adjacent to the first test multiplexer.

The data reference voltage may be a stepwisely increasing voltage generated by a single slope generator.

The single slope generator may be arranged in a margin area in which at least one gate driving circuit and at least one source driving circuit in a driving circuit included in the display device are not arranged.

In accordance with another aspect of the present disclosure, there is provided a test circuit of a microdisplay device which is arranged on a silicon substrate, wherein the test circuit selects at least one line of a plurality of data lines or a plurality of sensing lines arranged on a pixel array, converts a signal transmitted through the selected line into a digital signal to acquire test data, and outputs the acquired test data through a test pad unit arranged on the silicon substrate.

The test circuit may further include a first test multiplexer configured to select one of a plurality of data lines or a plurality of sensing lines according to a test mode; a second test multiplexer configured to select at least one line of the plurality of data lines or the plurality of sensing lines selected by the first test multiplexer; and a test converter configured to convert a signal received through the line selected by the second test multiplexer into a digital signal and to output test data having a predetermined number of bits, wherein the second test multiplexer and the test converter are arranged adjacent to the first test multiplexer.

The test pad unit may include the same number of test pads as the number of bits of the test data and a reference pad configured to be applied with a data reference voltage from a single slope generator, and the single slope generator may be arranged in a margin area.

In accordance with still another aspect of the present disclosure, there is provided a method of testing a microdisplay device including a silicon substrate configured to include a plurality of gate lines, a plurality of data lines, a plurality of sensing lines, and a pixel array on which a plurality of subpixels are arranged; a test circuit; and a test pad unit, the method including: selecting one of the plurality of data lines or the plurality of sensing lines according to a test mode; selecting at least one line of the selected plurality of data lines or sensing lines; and converting a signal received through the selected line to output the test data having a predetermined number of bits using an analog-to-digital converter.

As described above, according to various embodiments of the present disclosure, it is possible to provide a display device, a test circuit, and a test method thereof that enable high-speed accurate testing.

In addition, according to various embodiments of the present disclosure, it is possible to provide a display device, a test circuit, and a test method thereof that enable testing while having only small increase in size.

In addition, according to various embodiments of the present disclosure, it is possible to provide a display device, a test circuit, and a test method thereof that may increase the yield and reduce cost.

Further, according to various embodiments of the present disclosure, it is possible to provide a display device, a test circuit, and a test method thereof that enable external compensation.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Figure 1:
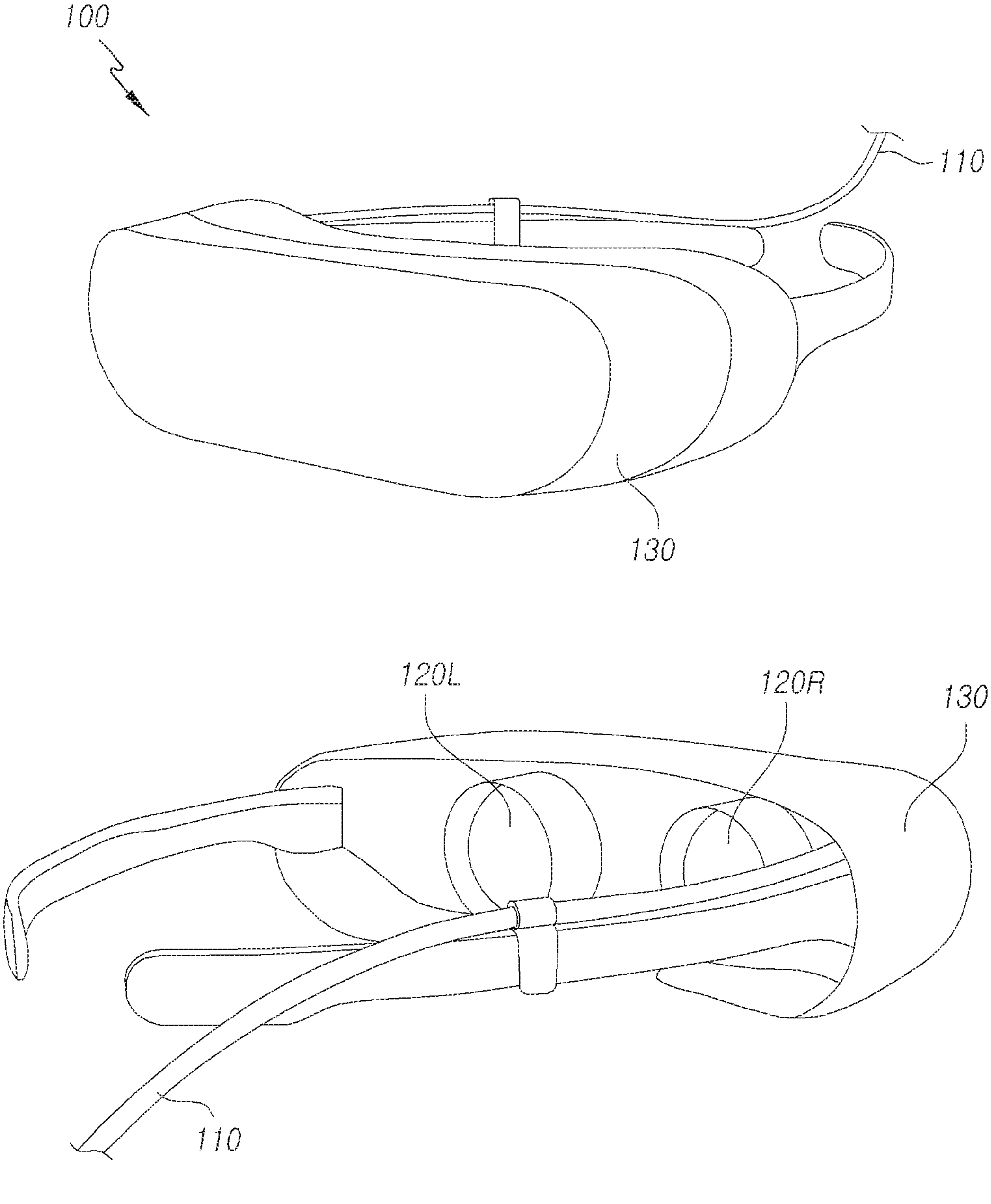
FIG. 1 shows an example of an electronic device using a microdisplay device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element “is connected to”, “is coupled to”, or “is bonded to” another structural element, it should be interpreted that another structural element may “be connected to”, “be coupled to”, or “be bonded to” the structural elements as well as that the certain structural element is directly connected to or is in direct contact with another structural element.

FIG. 1 shows an example of an electronic device using a microdisplay device according to embodiments of the present disclosure.

Referring to FIG. 1, an electronic device 100 according to the embodiments is an HMD type device which is a kind of wearable device for displaying an augmented reality or a virtual reality image.

The electronic device 100 according to the embodiments may include an image signal input unit 110 to which image data is input, a first display device 120L on which a first image (e.g., a left-eye image) based on an image signal is displayed, a second display device 120R on which a second image based on an image signal (e.g., a right-eye image) is displayed, and a case 130 for accommodating the image signal input unit 110, the first display device 120L, and the second display device 120R.

The image signal input unit 110 may include a wired cable or a wireless communication module connected to a terminal (e.g., a smart phone or the like) for outputting image data.

The first display device 120L and the second display device 120R are display components provided at positions corresponding to the left and right eyes of a user.

Each of the first display device 120L and the second display device 120R may include all or some of components of a microdisplay device 200.

Although the image signal input unit 110 is shown as a wired line in FIG. 1, the image signal input unit 110 may be implemented as a wireless interface.

In the present disclosure, it is assumed that the first display device 120L and the second display device 120R are organic light-emitting display devices implemented as a microdisplay type. However, the present disclosure is not limited thereto.

Figure 2:
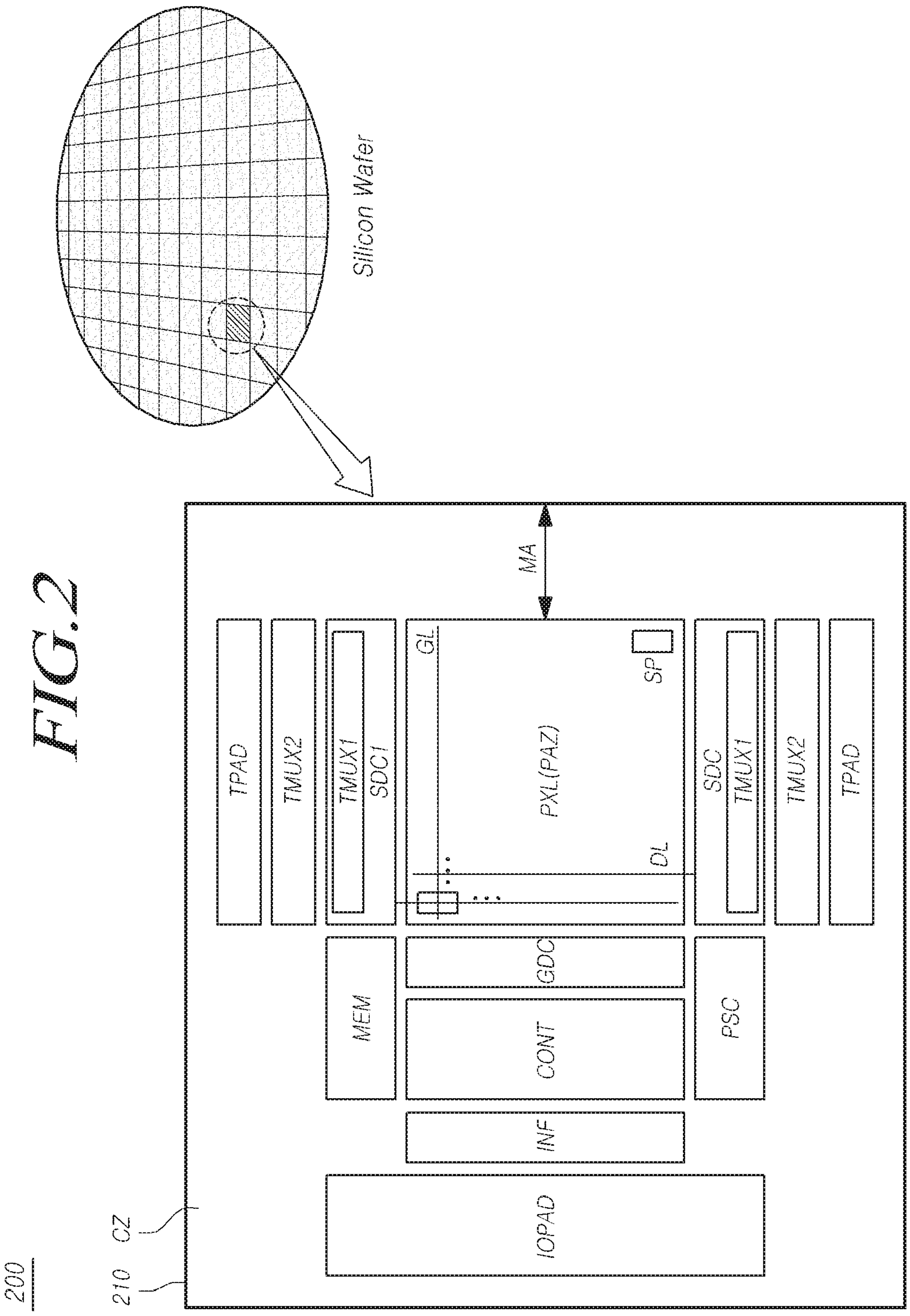
FIG. 2 is a schematic system configuration diagram of a microdisplay device according to embodiments of the present disclosure.

FIG. 2 is a schematic system configuration diagram of a microdisplay device according to embodiments of the present disclosure.

Referring to FIG. 2, the microdisplay device 200 according to embodiments of the present disclosure may have a backplane structure in which a pixel array PXL and various driving circuits are provided on a silicon substrate 210.

The silicon substrate 210 may be of a p-type or an n-type. In this specification, "p" means a hole and "n" means an electron.

The silicon substrate 210 may include a pixel array zone PAZ in which a pixel array PXL is arranged and a circuit zone CZ in which various driving circuits are arranged.

The circuit zone CZ of the silicon substrate 210 may be located around the pixel array zone PAZ of the silicon substrate 210. For example, the circuit zone CZ may be provided on one or both sides or three sides of the pixel array zone PAZ, or may be provided surrounding the periphery of the pixel array zone PAZ.

In FIG. 2, the entire zone of the silicon substrate 210 except for the pixel array zone PAZ is shown as the circuit zone CZ.

On the pixel array PXL, a plurality of data lines DL, a plurality of gate lines GL, and a plurality of subpixels SP defined by the plurality of data lines DL and the plurality of gate lines GL are arranged.

As shown in FIG. 2, on the pixel array PXL, the gate lines GL may be arranged to extend in a first direction and the data lines DL may be arranged in a second direction different from the first direction.

In addition, other than the plurality of data lines DL and the plurality of gate lines GL, signal wirings for supplying various signals and voltages to the plurality of subpixels SP may be arranged on the pixel array PXL.

For example, the signal wirings arranged on the pixel array PXL may further include a driving voltage line for transferring a driving voltage. In some cases, the signal wirings may further include a sensing line for transferring a reference voltage to the subpixel SP or sensing a characteristic value of the subpixel SP.

The signal wirings arranged on the pixel array PXL may be electrically connected to the driving circuits arranged on the circuit zone CZ of the silicon substrate 210.

The types and the number of circuit elements constituting each subpixel SP can be variously determined according to a providing function of the circuit elements, a design method thereof, and the like.

Meanwhile, the driving circuits arranged on the circuit zone CZ of the silicon substrate 210 may include at least one source driving circuit SDC, which may be arranged in the second direction, for driving the data lines, at least one gate driving circuit GDC, which may be arranged in the first direction, for driving the gate lines, and a controller CONT for controlling operations of the at least one source driving circuit SDC and the at least one gate driving circuit GDC.

The controller CONT supplies various control signals to the source driving circuit SDC and the gate driving circuit GDC to control the source driving circuit SDC and the gate driving circuit GDC.

Such a controller CONT starts scanning according to the timing implemented in each frame, switches input image data input from the outside according to a data signal type used in the source driving circuit SDC to output the switched image data, and controls data driving at an appropriate time according to the scanning.

In addition, the controller CONT may determine whether testing is performed to set a test mode, and may control a test circuit for testing.

The controller CONT may provide a test control signal including a test mode signal TDS, a pixel selection signal SSP, etc., to the test circuit.

The controller CONT may generate the test control signal in response to a command applied from the outside.

Here, the test mode signal TDS is a signal for setting test modes. The test mode signal TDS may separately designate data test modes to measure a data voltage transmitted via a data line or a sensing test mode to measure a current or a voltage applied to a specific node in each subpixel among the test modes.

The pixel selection signal SSP is a signal for selecting a subpixel to be tested among the plurality of subpixels SP arranged on the pixel array PXL.

Such a controller CONT may be a timing controller used in a typical display technology, or a control device including a timing controller to perform other control functions.

The source driving circuit SDC drives the plurality of data lines DL by receiving image data from the controller CONT and supplying a data voltage to the plurality of data lines DL. Here, the source driving circuit SDC is also referred to as a data driving circuit.

When a specific gate line is opened by the gate driving circuit GDC, the source driving circuit SDC converts the image data received from the controller CONT into an analog data voltage to supply the analog data voltage to the plurality of data lines DL.

The source driving circuit SDC may be positioned only on one side (e.g., the upper side or the lower side) of the pixel array PXL or may be positioned on both sides (e.g., the upper side and the lower side) of the pixel array PXL depending on a driving method of the source driving circuit SDC, a design method thereof, and the like.

In FIG. 2, for example, two source driving circuits SDC1 and SDC are arranged on the upper side and the lower side of the pixel array PXL.

In this case, the two source driving circuits SDC1 and SDC may alternately drive the plurality of data lines DL. For example, a first source driving circuit SDC1 may drive data lines DL for odd-numbered pixels (or subpixels), and a second source driving circuit SDC may drive data lines DL for even-numbered pixels (or subpixels).

This makes it possible to widen a pitch between the plurality of data lines DL driven by each source driving circuit to facilitate the design of the source driving circuit and stably drive the plurality of data lines DL.

When one source driving circuit SDC is arranged on one side (e.g., the upper side) of the pixel array PXL in the microdisplay device 200, the controller CONT may be arranged on the other side (e.g., the lower side) of the pixel array PXL. That is, the position of the controller CONT may be variously adjusted.

The source driving circuit SDC may include a shift register, a latch circuit, a digital-to-analog converter DAC, an output buffer OB, and the like.

Here, the digital-to-analog converter DAC is a component for converting the image data received from the controller CONT into a data voltage to be supplied to the data line DL.

In some cases, the source driving circuit SDC may further include an analog-to-digital converter ADC.

Figure 7:
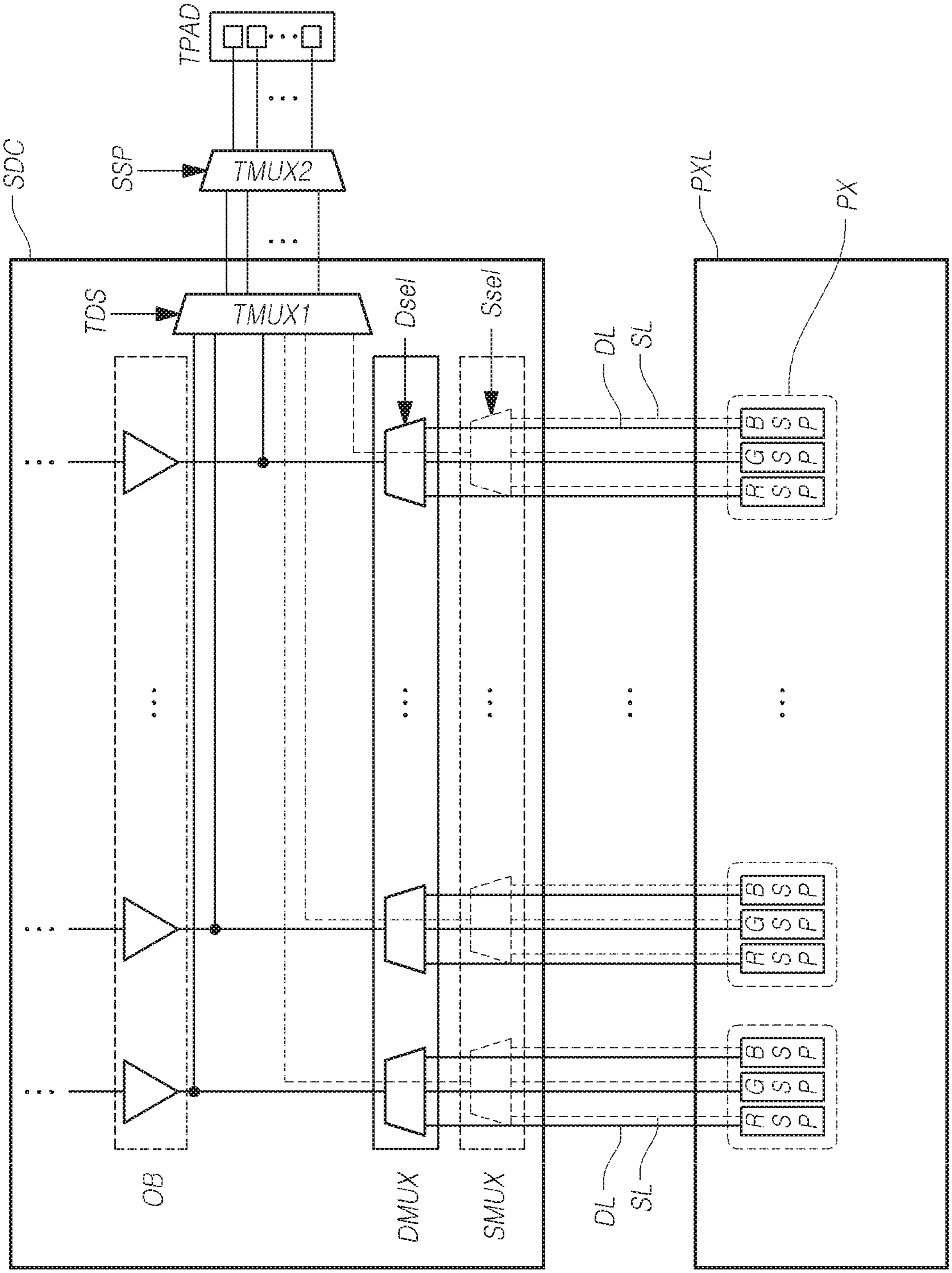

Meanwhile, as shown in FIG. 7, when a plurality of subpixels RSP, GSP, and BSP for each color of red (R), green (G), and blue (B) are included in the pixel array PXL (when the three subpixels RSP, GSP, and BSP of R, G, and B form one pixel PX), the source driving circuit SDC may further include a data multiplexer DMUX for separately outputting signals output from the output buffer OB to the data line corresponding to the subpixel for each color therein.

The DMUX may include a plurality of multiplexers MUXs to select the data line DL corresponding to one subpixel among the three subpixels RSP, GSP, and BSP included in one pixel, thereby supplying the signals output from the output buffer OB.

Accordingly, when the source driving circuit SDC includes the DMUX, the circuit of the shift register, the latch circuit, the number of circuits such as the shift register, the latch circuit, the digital-to-analog converter, and the output buffer OB, which are included in the source driving circuit SDC, may be reduced to ⅓ of the number of data lines DL required to be driven.

When one pixel is composed of four subpixels RSP, GSP, BSP, and WSP of R, G, B, and white (W), the data multiplexer DMUX may be configured to select one of four data lines DL corresponding to each of the plurality of pixels.

In addition, when the plurality of subpixels RSP, GSP, and BSP for each color are included in the pixel array PXL and a plurality sensing lines SL connected to the respective subpixels RSP, GSP, and BSP are arranged on the pixel array PXL, the source driving circuit SDC may further include a sensing multiplexer SMUX for selecting one of sensing lines SL corresponding to the subpixel for each color.

Similarly to the data multiplexer DMUX, the sensing multiplexer SMUX may be configured to select one of the sensing lines SL corresponding to each of the plurality of pixels PX.

Here, the plurality of sensing lines SL and the sensing multiplexer SMUX may be circuits included in order for the microdisplay device 200 to compensate for a characteristic value between the plurality of subpixels SP.

Like a general display device, a demand for a high-quality image for the microdisplay device 200 is also increasing. In order to provide a high-quality image in the display device, it is necessary to compensate for not only a characteristic value deviation between the subpixels SP generated during manufacturing of the display device but also a change in the characteristic value due to an increase in the driving time.

Accordingly, in the microdisplay device 200, the plurality of sensing lines SL and the sensing multiplexer SMUX are arranged on the pixel array PXL so that the characteristic value of the subpixel SP can be easily obtained.

Here, when the microdisplay device 200 is an organic light-emitting display, the characteristic value of the subpixel SP obtained through the sensing line SL may be a degradation level of a driving transistor or an organic light-emitting diode (OLED). The degradation level of the driving transistor or the OLED may be determined from a current or a voltage applied to a specific node of the subpixel SP.

There are various methods for determining the characteristic value of the subpixel SP, and detailed description thereof will be omitted here because they are well known in the art.

Meanwhile, the gate driving circuit GDC sequentially supplies scan signals to the plurality of gate lines GL to sequentially drive the plurality of gate lines GL. Here, the gate driving circuit GDC is also referred to as a scan driving circuit.

The gate driving circuit GDC sequentially supplies a scan signal of an On voltage or an Off voltage to the plurality of gate lines GL under the control of the controller CONT.

The gate driving circuit GDC may include a shift register, a level shifter, and the like.

The gate driving circuit GDC may be positioned only on one side (e.g., the left side or the right side) of the pixel array PXL. In some cases, the gate driving circuit GDC may be positioned on both sides (e.g., the left side and the right side) of the pixel array PXL depending on a driving method of the gate driving circuit GDC, a design method thereof, and the like.

In FIG. 2, a silicon wafer is shown on which a number of semiconductor chips are made by standard semiconductor processes. After the circuits are made, the wafer is diced to singular the individual semiconductor chips from each other. Each semiconductor chip has a substrate 210 with the gate driving circuit GDC may be positioned only on one side of the pixel array PXL. There is a margin area MA on the other side of the pixel array PXL. Such a margin area MA is provided to prevent damage to the pixel array PXL that might occur when semiconductor chip is diced from the silicon wafer, which might be done by sawing the silicon wafer. In addition, the margin area MA is used to uniformize the characteristics of the plurality of gate lines GL and the plurality of data lines DL uniformly arranged in the pixel array zone PAZ.

However, as shown in FIG. 2, the margin area MA is also included in the circuit zone CZ, and driving circuits may be arranged thereon.

The driving circuits arranged on the circuit zone CZ of the silicon substrate 210 may further include a memory MEM.

The memory MEM includes a line memory LM for temporarily storing image data output from the controller CONT and outputting the image data to the source driving circuit SDC at a timing designated by the controller CONT.

The memory MEM may be arranged inside or outside the source driving circuit SDC, and may be arranged between the controller CONT and the source driving circuit SDC when the memory MEM is arranged outside the source driving circuit SDC.

In addition, the memory MEM may further include a buffer memory for storing input image data received from the outside and supplying the stored input image data to the controller CONT.

Meanwhile, the driving circuit arranged on the circuit zone CZ may further include a power circuit PSC for providing various signals and voltages required for driving the subpixels SP arranged on the pixel array PXL to other circuits SDC1, SDC, GDC, and CONT or supplying the same to the pixel array PXL.

Here, the power circuit PSC may include a power generator such as a DC-DC converter, and may generate and output various voltages required by the pixel array PXL from various power voltages supplied from the outside.

For example, the power circuit PSC may generate and output a driving voltage EVDD and a base voltage EVSS for driving the subpixel SP.

In addition, the driving circuits arranged on the circuit zone CZ of the silicon substrate 210 may further include an interface INF for signal input/output or communication with other external electronic devices or electronic components.

Such an interface INF may include, for example, one or more of a low-voltage differential signaling (LVDS) interface, a mobile industry processor interface (MIPI), and a serial interface.

In addition, on the circuit zone CZ of the silicon substrate 210, an input/output pad unit IOPAD including a plurality of pads for electrically connecting other electronic components outside the silicon substrate 210 to the driving circuits may be arranged.

The plurality of pads of the input/output pad unit IOPAD may be used for signal input/output, power supply, or communication.

In particular, the input/output pad unit IOPAD may receive input image data to be transmitted from an external device to the controller CONT.

In FIG. 2, although the input/output pad unit IOPAD is arranged on only one side of the silicon substrate 210, the position of the input/output pad unit IOPAD may be variously adjusted and the input/output pad unit IOPAD may be distributed in various positions. However, when the input/output pad unit IOPAD is arranged on the edge side of the silicon substrate 210, it is possible to facilitate the electrical connection of the input/output pad unit IOPAD with other electronic components and the arrangement of the driving circuits.

In addition, when the input/output pad unit IOPAD is arranged on one side of the silicon substrate 210, that is, when the input/output pad unit IOPAD is arranged at a position where the plurality of driving circuits (particularly, the interface INF) are arranged, as shown in FIG. 2, there is an advantage that the wiring between the input/output pad unit IOPAD and the driving circuit is easy.

Meanwhile, the pixel array PXL including a transistor on the pixel array zone PAZ of the silicon substrate 210 and the driving circuits including a transistor on the circuit zone CZ of the silicon substrate 210 may be manufactured in the same process.

As described above, in the microdisplay device 200, the driving circuits such as the source driving circuit SDC, the gate driving circuit GDC, the controller CONT, the power circuit PSC, etc., as well as the pixel array PXL may be all formed on the silicon substrate 210, thereby miniaturizing the size of the device and easily and quickly performing the manufacturing process.

All or some of the components of the microdisplay device 200 according to the embodiments of the present disclosure described above may be manufactured in a silicon wafer manufacturing process.

In view of this, all or some of the components of the microdisplay device 200 according to the embodiments of the present disclosure may be regarded as a semiconductor chip as a kind of integrated circuit manufactured through the silicon wafer manufacturing process (semiconductor process).

Accordingly, all or some of the components of the microdisplay device 200 according to the embodiments of the present disclosure may be referred to as a display integrated circuit.

As described above, the microdisplay device 200 according to the embodiments of the present disclosure can be manufactured precisely, easily, and conveniently since all or some of the components of the microdisplay device 200 are manufactured through the silicon wafer manufacturing process.

However, since the microdisplay device 200 is manufactured through the silicon wafer manufacturing process, a test method suitable for the microdisplay device 200 is required.

Accordingly, the microdisplay device 200 of FIG. 2 may further include a test circuit.

Referring again to FIG. 2, the microdisplay device 200 may further include a first test multiplexer TMUX1, a second test multiplexer TMUX2, and a test pad unit TPAD, as the test circuit.

Here, the first test multiplexer TMUX1 may be arranged inside the source driving circuit SDC.

The first test multiplexer TMUX1 may connect the plurality of data lines DL to the second test multiplexer TMUX2 in the data test mode and may connect the plurality of sensing lines SL to the second test multiplexer TMUX2 in the sensing test mode, according to the test mode signal TDS.

Here, the reason why the first test multiplexer TMUX1 selects the plurality of data lines DL or the plurality of sensing lines SL to connect the selected lines to the second test multiplexer MUX2 is to separately determine whether the driving circuit is normal in a process in which the data voltage is output in the source driving circuit SDC and whether each subpixel SP of the pixel array PXL is normal.

Meanwhile, when the first test multiplexer TMUX1 is not in the test mode, the first test multiplexer TMUX1 cuts off the connection between the plurality of data lines DL and the plurality of sensing lines SL with the second test multiplexer TMUX2.

That is, the first test multiplexer TMUX1 distinguishes the data test mode from the sensing test mode at the time of the test mode, selects one of the plurality of data lines DL and the plurality of sensing lines SL, and electrically connects the selected one to the second test multiplexer TMUX2.

Meanwhile, the second test multiplexer TMUX2 selects a predetermined number of lines among the plurality of data lines DL or the plurality of sensing lines SL connected through the first test multiplexer TMUX1 in response to the pixel selection signal SSP, and electrically connects the selected lines to the test pad unit TPAD.

Here, the second test multiplexer TMUX2 may select the same number of lines as the number of test pads included in the test pad unit TPAD.

The test pad unit TPAD includes a plurality of test pads, and is electrically connected to an external measurement device at the time of testing to transmit a signal transmitted from the second test multiplexer TMUX2 to the external measurement device.

In the microdisplay device 200, each of the plurality of pads merely provides an electrical connection function, and occupies a relatively large area because it should be connected to an external device by a wire bonding method or the like in comparison with other individual components of the microdisplay device 200.

However, since the microdisplay device 200 is provided in the form of an integrated circuit (IC) on a silicon substrate, the size of the microdisplay device 200 must be reduced in order to increase the production yield and reduce the manufacturing cost.

Accordingly, it is very important to reduce the number of pads in order to reduce the size.

Thereby, the microdisplay device 200 of FIG. 2 provides the first and second test multiplexers TMUX1 and TMUX2 so that a predetermined number of lines are selected from the plurality of data lines DL or the plurality of sensing lines SL and connected to the test pad unit TPAD, thereby reducing the number of test pads to reduce the size of the microdisplay device 200.

That is, measurement may be performed by an external measurement device while an increase in the size of the microdisplay device 200 is suppressed.

Although the input/output pad unit IOPAD and the test pad unit TPAD are arranged in the circuit zone CZ for the sake of convenience, the input/output pad unit IOPAD and the test pad unit TPAD may be arranged in a separate pad zone separately from the pixel array zone PAZ or the circuit zone CZ on the silicon substrate 210 because they are merely connection means for electrical connection with an external device.

Figure 3:
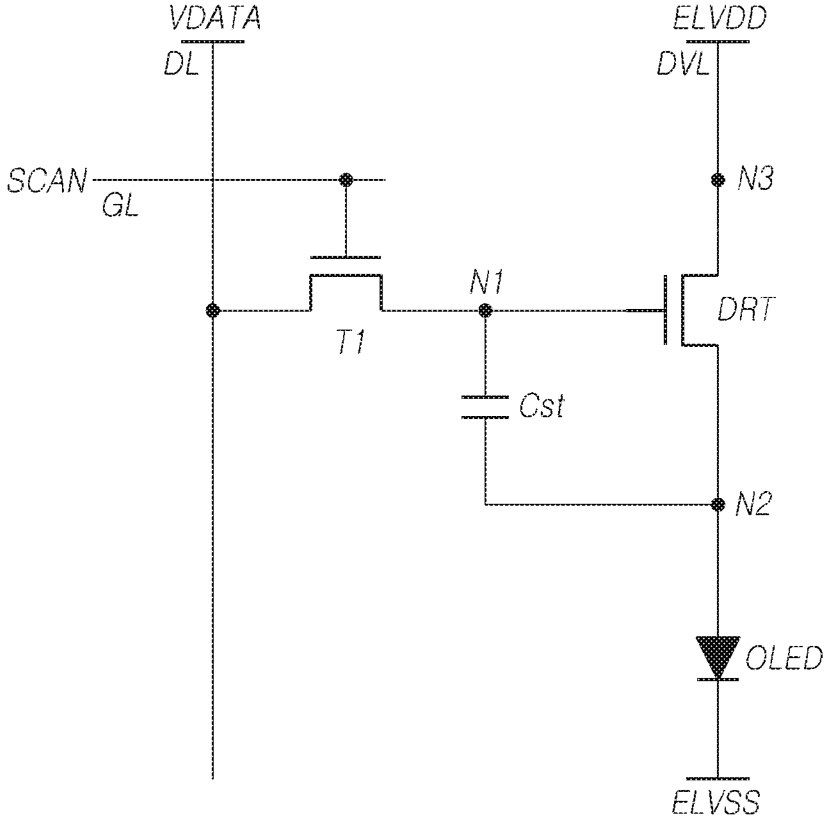
FIGS. 3 and 4 show examples of a subpixel structure of a microdisplay device according to embodiments of the present disclosure.
Figure 4:
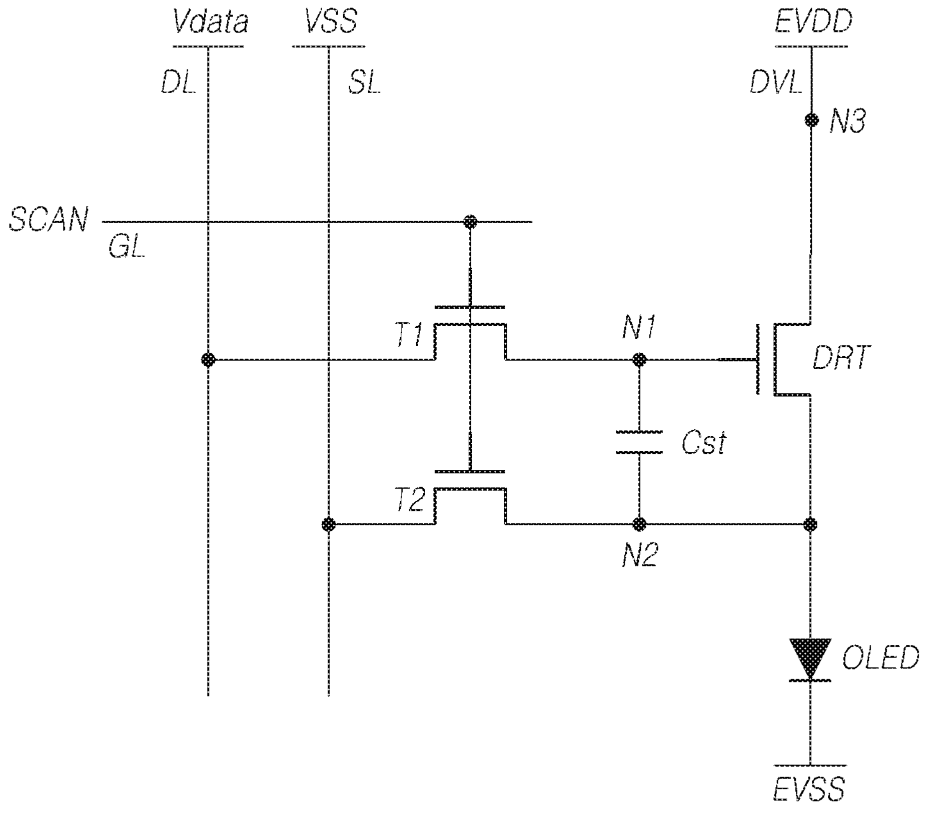

FIGS. 3 and 4 show examples of a subpixel structure of a microdisplay device according to embodiments of the present disclosure.

Referring to FIG. 3, in the microdisplay device 200 according to the embodiments of the present disclosure, each of a plurality of subpixels SP may include an organic light-emitting diode OLED, a driving transistor DRT for driving the OLED, a first transistor T1 electrically connected to a first node N1 of the driving transistor DRT and a data line DL, and a capacitor Cst electrically connected to the first node N1 and the second node N2 of the driving transistor DRT, and may be implemented.

The OLED may be composed of a first electrode (e.g., an anode electrode or a cathode electrode), an organic light-emitting layer OEL, and a second electrode (e.g., a cathode electrode or an anode electrode).

The first electrode of the OLED may be electrically connected to the second node N2 of the driving transistor DRT. A base voltage EVSS may be applied to the second electrode of the OLED.

Here, the base voltage EVSS may be a kind of common voltage applied to all the subpixels SP.

The driving transistor DRT drives the OLED by supplying a driving current to the OLED.

The driving transistor DRT has the first node N1, the second node N2, and a third node N3.

The first node N1 of the driving transistor DRT is a node corresponding to a gate node, and may be electrically connected to a source node or a drain node of the first transistor T1.

The second node N2 of the driving transistor DRT may be electrically connected to the first electrode of the OLED and may be a source node or a drain node.

The third node N3 of the driving transistor DRT is a node to which a driving voltage EVDD is applied and may be electrically connected to a driving voltage line DVL for supplying the driving voltage EVDD, and may be a drain node or a source node.

Here, the driving voltage EVDD may be a kind of common voltage applied to all the subpixels SP.

The first transistor T1 may be controlled to be turned on and off by receiving a first scan signal SCAN to the gate node through the gate line.

The first transistor T1 is turned on by the first scan signal SCAN to transmit a data voltage Vdata supplied from the data line DL to the first node N1 of the driving transistor DRT.

The first transistor T1 is also referred to as a switching transistor.

The capacitor Cst may be electrically connected to the first node N1 and the second node N2 of the driving transistor DRT, and may maintain the data voltage Vdata corresponding to an image signal voltage or a voltage corresponding thereto during one frame time.

As described above, one subpixel SP illustrated in FIG. 3 may have a 2 transistor (T) and 1 capacitor (2T1C) structure including two transistors DRT and T1 and one capacitor Cst in order to drive the OLED.

The subpixel structure (2T1C structure) illustrated in FIG. 3 is merely an example for convenience of description, and one subpixel SP may further include one or more transistors or one or more capacitors according to a function, a panel structure, and the like.

Referring to FIG. 4, in a microdisplay device according to the present embodiments, each of the plurality of subpixels SP may further include a second transistor T2 electrically connected to the second node N2 of the driving transistor DRT and the sensing line SL.

In the second transistor T2, the gate node may be electrically connected to the gate line GL, a drain node or a source node may be electrically connected to the sensing line SL, and the source node or the drain node may be electrically connected to the second node N2 of the driving transistor DRT.

The second transistor T2 may be controlled to be turned on/off by a scan signal SCAN applied to the gate node.

In the subpixel structure of FIG. 4, the gate node of the first transistor T1 and the gate node of the second transistor T2 may be electrically connected to each other and connected to one gate line GL in common.

In this case, the gate node of the first transistor T1 and the gate node of the second transistor T2 may be applied with the scan signal SCAN together.

Unlike this, the gate node of the first transistor T1 and the gate node of the second transistor T2 may be connected to different gate line GL, respectively.

In this case, the gate node of the first transistor T1 and the gate node of the second transistor T2 may be applied with the scan signal SCAN individually.

The second transistor T2 may be turned on to apply a reference voltage VSS to the second node N2 of the driving transistor DRT.

In addition, the second transistor T2 may be turned off to electrically float the second node N2 of the driving transistor DRT.

As described above, the voltage state of the second node N2 of the driving transistor DRT may be controlled through the second transistor T2 and the sensing line SL in accordance with a driving type, a driving situation, and the like.

Each of the driving transistor DRT, the first transistor T1, and the second transistor T2 may be an n-type or p-type transistor.

A storage capacitor Cst is an external capacitor which is intentionally designed outside the driving transistor DRT, other than a parasitic capacitor (e.g., Cgs or Cgd) which is an internal capacitor existing between the first node N1 and the second node N2 of the driving transistor DRT.

Figure 5:
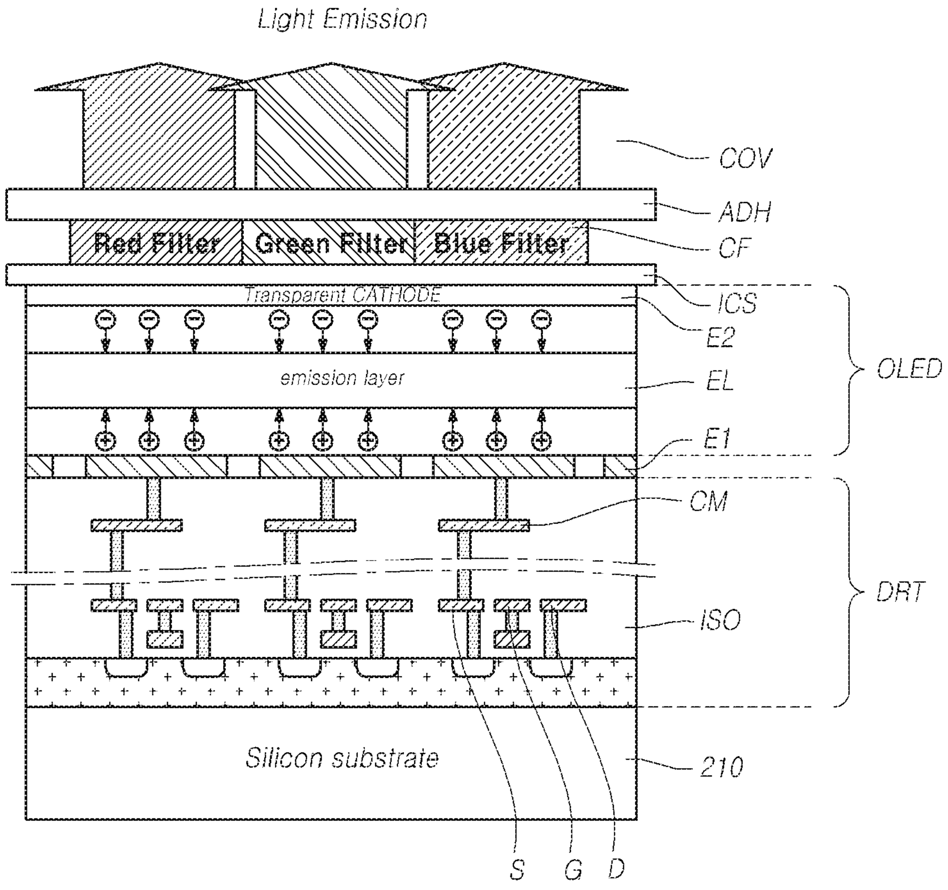
FIG. 5 is a cross-sectional view showing a pixel structure of a microdisplay device according to embodiments of the present disclosure.

FIG. 5 is a cross-sectional view showing a pixel structure of a microdisplay device according to embodiments of the present disclosure.

FIG. 5 shows an example of a pixel structure in which subpixels of R, G, and B constitute one pixel.

In FIG. 5, the silicon substrate 210 may be a p-type substrate or an n-type substrate. Here, assuming that the silicon substrate 210 is the p-type substrate, description will be made.

An insulating layer ISO is arranged on the silicon substrate 210, and a gate electrode G, a source electrode S, and a drain electrode D are arranged inside the insulating layer ISO.

In addition, the driving transistor DRT is also arranged on the silicon substrate 210.

The source and the drain of the driving transistor DRT may be arranged at positions corresponding to the source electrode S and the drain electrode D on the silicon substrate 210.

The gate of the driving transistor DRT is arranged inside the insulating layer ISO and is arranged at a position corresponding to the gate electrode G.

The gate, source, and drain of the driving transistor DRT may be electrically connected to the gate electrode G, the source electrode S, and the drain electrode D through a contact hole, respectively.

Meanwhile, a contact metal CM arranged inside the insulating layer ISO may be connected to the source electrode S or the drain electrode D through the contact hole of the insulating layer ISO. Here, the contact metal CM may be a sensing line SL.

Meanwhile, a first electrode E1 of the OLED may be arranged on the insulating layer ISO. The first electrode E1 may be electrically connected to the contact metal CM through the contact hole of the insulating layer ISO. Here, the first electrode E1 may be an anode electrode of the OLED.

A light-emitting layer EL may be arranged on the first electrode E1, and a second electrode E2 may be arranged on the light-emitting layer EL. Here, the second electrode E2 may be a cathode electrode of the OLED.

As shown in FIG. 5, the second electrode E2 may be a common electrode commonly formed on a plurality of subpixels.

The OLED is implemented by the first electrode E1, the light-emitting layer EL, and the second electrode E2.

Meanwhile, a protection layer ICS may be arranged on the second electrode E2 and a color filter layer CF may be arranged on the protection layer ICS. Here, the color filter layer CF may include a red filter, a green filter, and a blue filter to realize the subpixels of R, G, and B.

A protection cover COV may be arranged on the color filter layer CF. At this time, the protection cover COV may be attached by an adhesive layer ADH.

In FIG. 5, as an example of a microdisplay device, the light-emitting layer EL is configured to emit light of a single color. The color filter layer CF allows the light-emitting layer EL to emit light of R, G, and B corresponding to each subpixel. At this time, the light-emitting layer EL may emit white light.

However, as another example, a plurality of different light-emitting layers emitting light of R, G, and B are arranged to correspond to subpixels, respectively, so that each subpixel may be configured to emit light of R, G, and B. In this case, the color filter layer CF may be omitted.

In addition, in FIG. 5, three subpixels SP corresponding to R, G, and B constitute one pixel. However, four subpixels may constitute one pixel. For example, four subpixels may be subpixels that emit light of R, G, B, and W.

In such a microdisplay device, various circuit elements of the subpixel including the driving transistor DRT are generally formed on the silicon substrate 210, and then the OLED may be formed through a deposition method.

Figure 6:
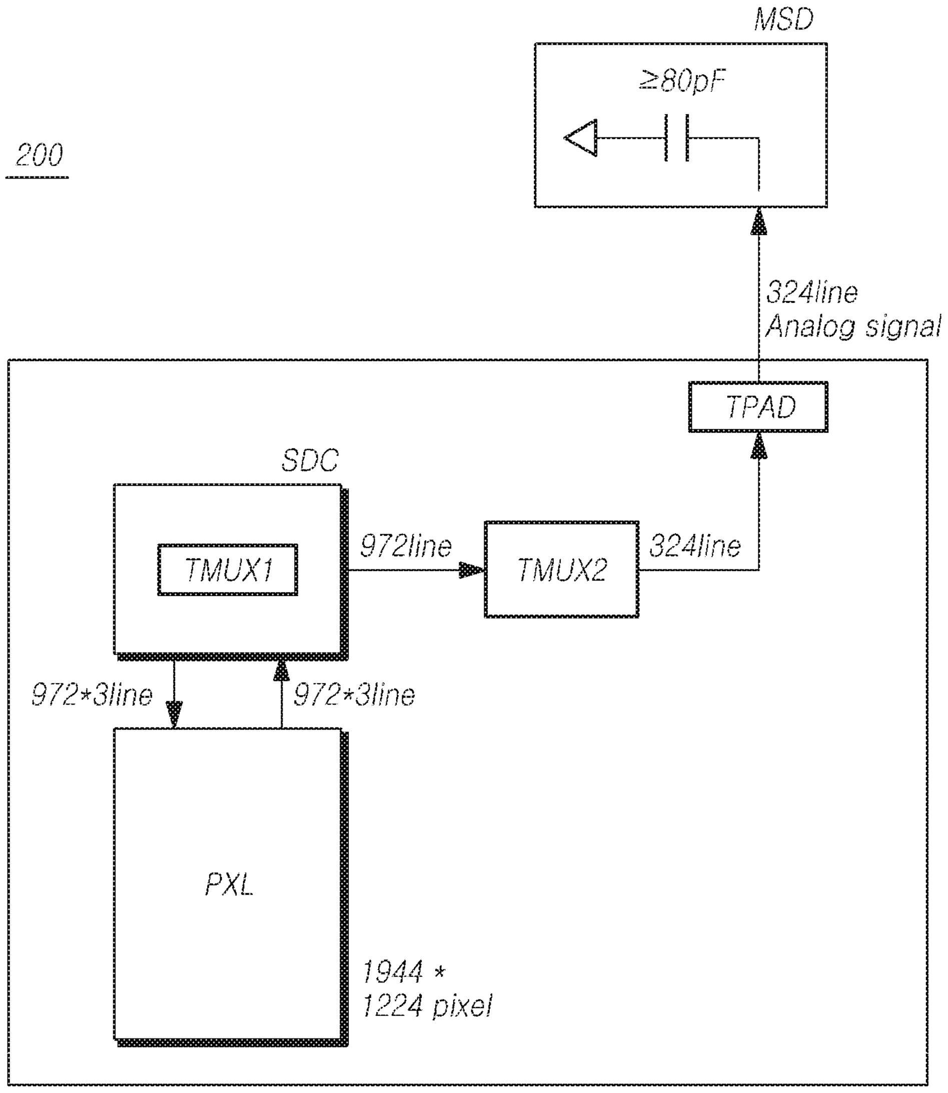
FIGS. 6 and 7 are views separately showing components for testing in the microdisplay device of FIG. 2.

FIGS. 6 and 7 are views separately showing components for testing in the microdisplay device of FIG. 2.

In FIGS. 6 and 7, for convenience of description, only the source driving circuit SDC positioned on one side of the pixel array PXL and a test component connected to the source driving circuit SDC in the microdisplay device 200 of FIG. 2 are shown.

In addition, since FIG. 7 is a diagram illustrating a component for testing, only the configuration other than the output buffer OB in the source driving circuit SDC is shown briefly.

For example, it is assumed that the microdisplay device 200 has a resolution of 1944*1224, that is, pixels of 1944*1224.

Since the microdisplay device 200 of FIG. 2 includes two source driving circuits SDC, the number of pixels driven by one source driving circuit SDC is 1944/2=972.

When three subpixels RSP, GSP and BSP of R, G, and B constitute one pixel PX, the number of subpixels to which a data voltage is required to be supplied by one source driving circuit SDC is 972*3=2916.

That is, each of two source driving circuits SDC drives the data lines DL of 2,916 lines.

Meanwhile, as shown in FIG. 4, when the sensing line SL is arranged to correspond to the data line DL, the source driving circuit SDC is electrically connected to the sensing line SL of 972*3 lines.

However, as shown in FIG. 7, the source driving circuit SDC may include a data multiplexer DMUX and a sensing multiplexer SMUX, and may multiplex the data lines DL of 972*3 lines in 3:1 according to a selection signal Dsel, and the sensing lines SL of 972*3 lines in 3:1 according to a selection signal Ssel.

That is, the data multiplexer DMUX may selectively supply the data voltage output from 972 output buffers OB to the data lines DL of 972*3 lines, and the sensing multiplexer SMUX may select 972 sensing lines SL among the sensing lines SL of 972*3 lines.

The first test multiplexer TMUX1 selects one of the 972 data lines DL and the 972 sensing lines SL in the test mode according to the test mode signal TDS, and electrically connects the selected one to the second test multiplexer TMUX2.

For example, when the test mode signal TDS does not designate the test mode, the first test multiplexer TMUX1 does not connect both the data lines DL and the sensing lines SL to the second test multiplexer TMUX2.

However, in the case of the data test mode in the test mode, the 972 data lines DL are connected to the second test multiplexer TMUX2. In the case of the sensing test mode, the 972 sensing lines SL are connected to the second test multiplexer TMUX2.

That is, the first test multiplexer TMUX1 connects the 972 lines to the second test multiplexer TMUX2.

The second test multiplexer TMUX2 selects a designated number of lines among the 972 lines selected by the first test multiplexer TMUX1 according to the pixel selection signal SSP.

Here, the second test multiplexer TMUX2 performs multiplexing of 3:1 to correspond to the number of test pads included in the test pad unit TPAD to select 324 lines.

Next, a signal transmitted to the selected 324 lines is transmitted to an external measurement device MSD through the test pad of the test pad unit TPAD.

Next, the second test multiplexer TMUX2 may change the line selected according to the pixel selection signal SSP so that all the lines are sequentially connected to the test pad unit TPAD.

Accordingly, the signal transmitted to the test pad unit TPAD may be different depending on the test mode.

The external measurement device MSD measures the signal transmitted through 324 test pads of the test pad unit TPAD. Here, the transmitted signal is an analog signal.

The external measurement device MSD measures the voltage or current of a plurality of analog signals transmitted through the test pad unit TPAD.

Meanwhile, an input parasitic capacitance of the external measurement device MSD is typically 80 pF or more. The input parasitic capacitance is a very high capacitance in view of the driving circuits of the microdisplay device 200 driven by low power, and causes a transmission delay in a process in which a signal output from the test pad unit TPAD is transmitted to the measurement device MSD.

Thereby, it requires several hundred milliseconds to several seconds for the measurement device MSD to measure all the signals transmitted to the plurality of data lines DL and the plurality of sensing lines SL.

This is a very long time for testing, which increases testing costs and decreases productivity.

In addition, FIGS. 6 and 7 show only the test circuit connected to one of two source driving circuits SDC1 and SDC in the microdisplay device 200 of FIG. 2. Accordingly, the number of test pads included in the test pad unit TPAD is 324*2.

Although the number of test pads is very small compared to the total number of data lines DL and sensing lines SL, the size of the test pad unit TPAD is a factor that lowers the yield of the microdisplay device 200 in consideration of the area occupied by each test pad in the microdisplay device 200.

When the number of test pads included in the test pad unit TPAD is reduced to increase the yield of the microdisplay device 200, the time measured by the measurement device MSD is further increased so that the testing cost is increased.

Figure 8:
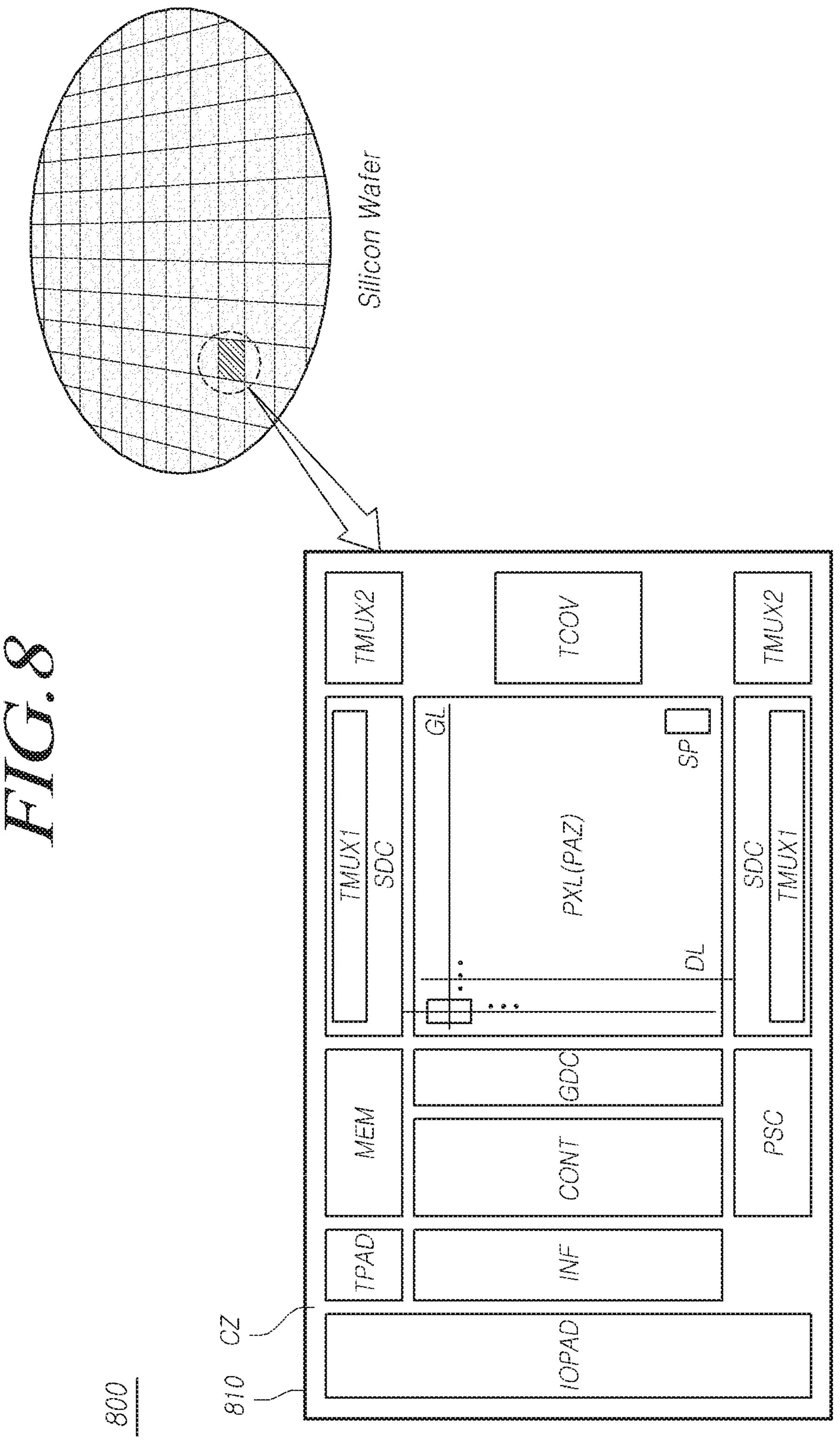
FIG. 8 is a schematic system configuration diagram of a microdisplay device according to other embodiments of the present disclosure.

FIG. 8 is a schematic system configuration diagram of a microdisplay device according to other embodiments of the present disclosure.

Referring to FIG. 8, based on a comparison between a microdisplay device 800 of FIG. 8 and the microdisplay device 200 of FIG. 2, the pixel array PXL and the driving circuits are the same as those of FIG. 2 and may be arranged on the same positions of the silicon substrate 810.

That is, at least one source driving circuit SDC, at least one gate driving circuit GDC, a controller CONT, a memory MEM, a power circuit PSC, an interface INF, and an input/output pad unit IOPAD may perform the same operations as those of the microdisplay device 200 of FIG. 2, and may be arranged at the same positions.

The test circuit of the microdisplay device 800 of FIG. 8 also includes a first test multiplexer TMUX1, a second test multiplexer TMUX2, and a test pad unit TPAD, similar to the test circuit of FIG. 2.

However, in FIG. 8, the test circuit of the microdisplay device 800 further includes a test converter TCOV.

In addition, the second test multiplexer TMUX2 selects one or more lines of a plurality of data lines DL or a plurality of sensing lines SL connected through the first test multiplexer TMUX1, and connects the selected one or more lines to the test converter TCOV.

At this time, the second test multiplexer TMUX2 may sequentially vary and select the plurality of data lines DL or the plurality of sensing lines SL selected by the first test multiplexer TMUX1.

The test converter TCOV includes an analog-to-digital converter ADC, and converts an analog signal transmitted through the line selected by the second test multiplexer TMUX2 into a digital signal to output test data to the test pad unit TPAD.

That is, unlike the test circuit of the microdisplay device 200 of FIG. 2, the test circuit in the microdisplay device 800 of FIG. 8 may convert an analog signal transmitted from the selected data line DL or sensing line SL into test data which is a digital signal, and may transmit the converted test data Dout to an external measurement device MSD through the test pad unit TPAD.

Accordingly, the test pad unit TPAD includes only the same number of test pads as the number of bits of the test data Dout to output the test data Dout to the measurement device MSD.

As a result, the number of test pads may be greatly reduced. Also, the number of lines for electrically connecting the test converter TCOV and the test pad unit TPAD is greatly reduced.

In FIG. 2, a large number of the test pad units TPAD are provided so that a position where the test pad unit TPAD can be arranged on the silicon substrate 210 is limited to an edge side where the input/output pad unit IOPAD is not located.

In addition, in consideration of the wiring of a plurality of test pads of the test pad unit TPAD, the test pad unit TPAD may be arranged only on the edge side in a direction in which the source driving circuit SDC is arranged.

However, in FIG. 8, since the test pad unit TPAD includes the same number of test pads as the number of bits of the test data Dout, the number of test pads is greatly reduced, so that the test pad unit TPAD and the test circuit may be freely arranged at arbitrary positions on the silicon substrate 810.

In particular, the test pad unit TPAD may be freely arranged at an arbitrary position on the silicon substrate 810.

In FIG. 8, for example, the test pad unit TPAD is arranged adjacent to the input/output pad unit IOPAD.

When the test pad unit TPAD is arranged adjacent to the input/output pad unit IOPAD, a distance between the test pad unit TPAD and the second test multiplexer TMUX is increased, but the test pad unit TPAD may perform several processes including a bonding process for connecting the microdisplay device 800 to an external device together with the input/output pad unit IOPAD, thereby reducing the manufacturing cost.

However, since the number of wirings required to be connected to the test pad unit TPAD and the second test multiplexer TMUX2 is not large, a cost increase due to this is not large.

Meanwhile, in FIG. 8, the second test multiplexer TMUX2 and the test converter TCOV are arranged adjacent to the source driving circuit SDC and arranged in a margin area MA where the driving circuit is not located in FIG. 2.

As described above, the margin area MA is a space for preventing damage to the pixel array PXL and uniformizing the characteristics of the plurality of gate lines GL and the plurality of data lines DL on the pixel array PXL, that is, the characteristics of the subpixel SP.

Accordingly, the microdisplay device 800 of FIG. 8 in which the second test multiplexer TMUX2 and the test converter TCOV are arranged in the margin area MA and the test pad unit TPAD is arranged adjacent to the input/output pad unit IOPAD may have the same transverse length as the microdisplay device 200 of FIG. 2.

Since a plurality of lines are required to be arranged between the second test multiplexer TMUX2 and the plurality of test pads of the test pad unit TPAD in FIG. 2, they are arranged between the source driving circuit SDC and the test pad unit TPAD.

However, the second test multiplexer TMUX2 has a multiplexer structure that can be implemented by a plurality of switches, and the actual circuit size is not large. In FIG. 8, since the number of test pads is small, the second test multiplexer TMUX2 may be arranged in the margin area MA of the side surface of the source driving circuit SDC as shown in FIG. 8.

In some cases, the transverse length of the microdisplay device 800 may be partially increased by the second test multiplexer TMUX2 and the test converter TCOV, but a size change due to the increased transverse length is not large.

In contrast, in the microdisplay device 800 of FIG. 8, the transverse length may be more reduced than the microdisplay device 200 as the number and position of the test pad units TPAD are changed.

Accordingly, the size of the microdisplay device 800 of FIG. 8 may be reduced in comparison with the microdisplay device 200 of FIG. 2 as a whole, and the manufacturing cost may be reduced by increasing the yield.

Figure 9:
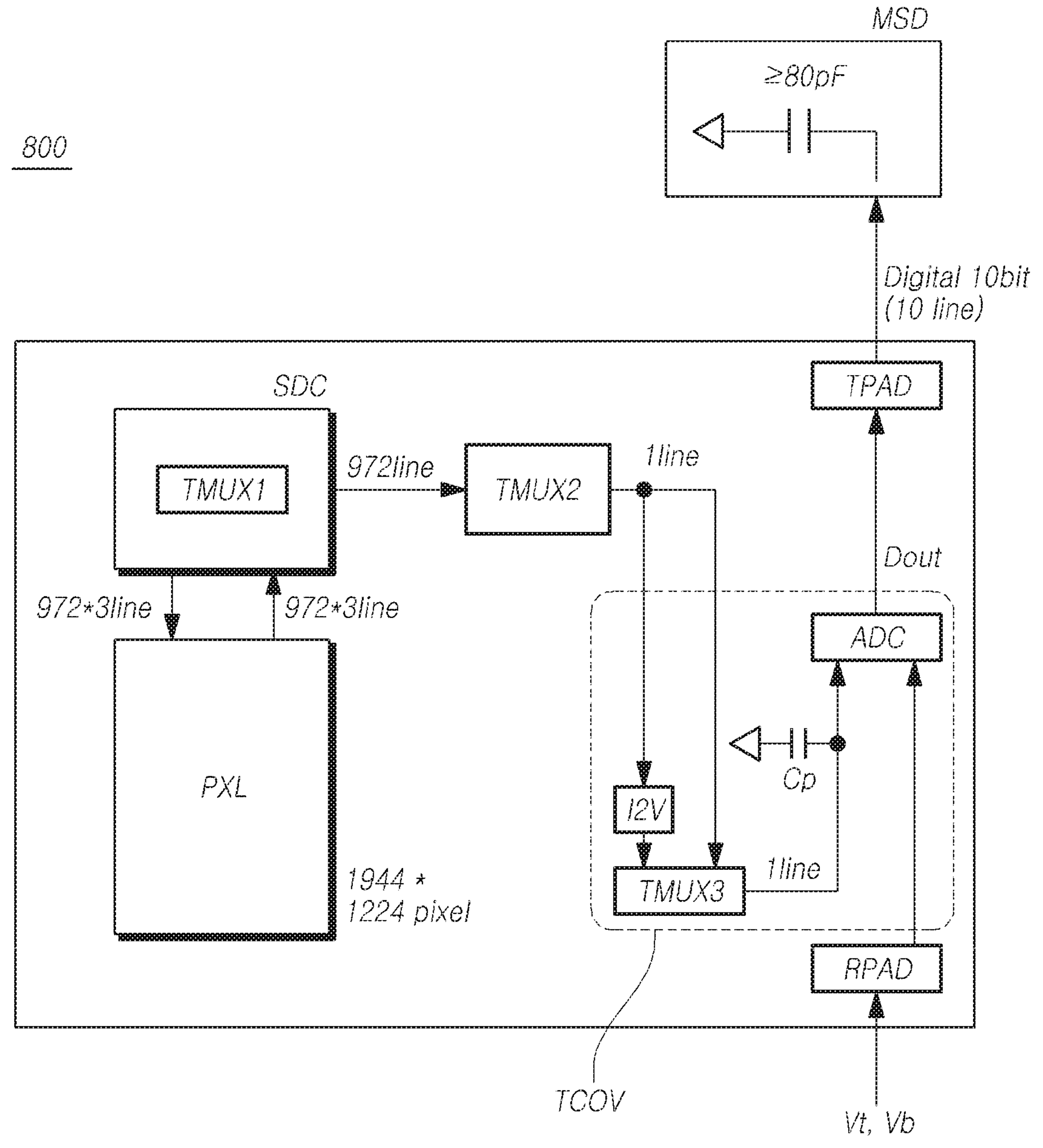
FIGS. 9 and FIG. 10 are views separately showing components for testing in the microdisplay device of FIG. 8.
Figure 10:
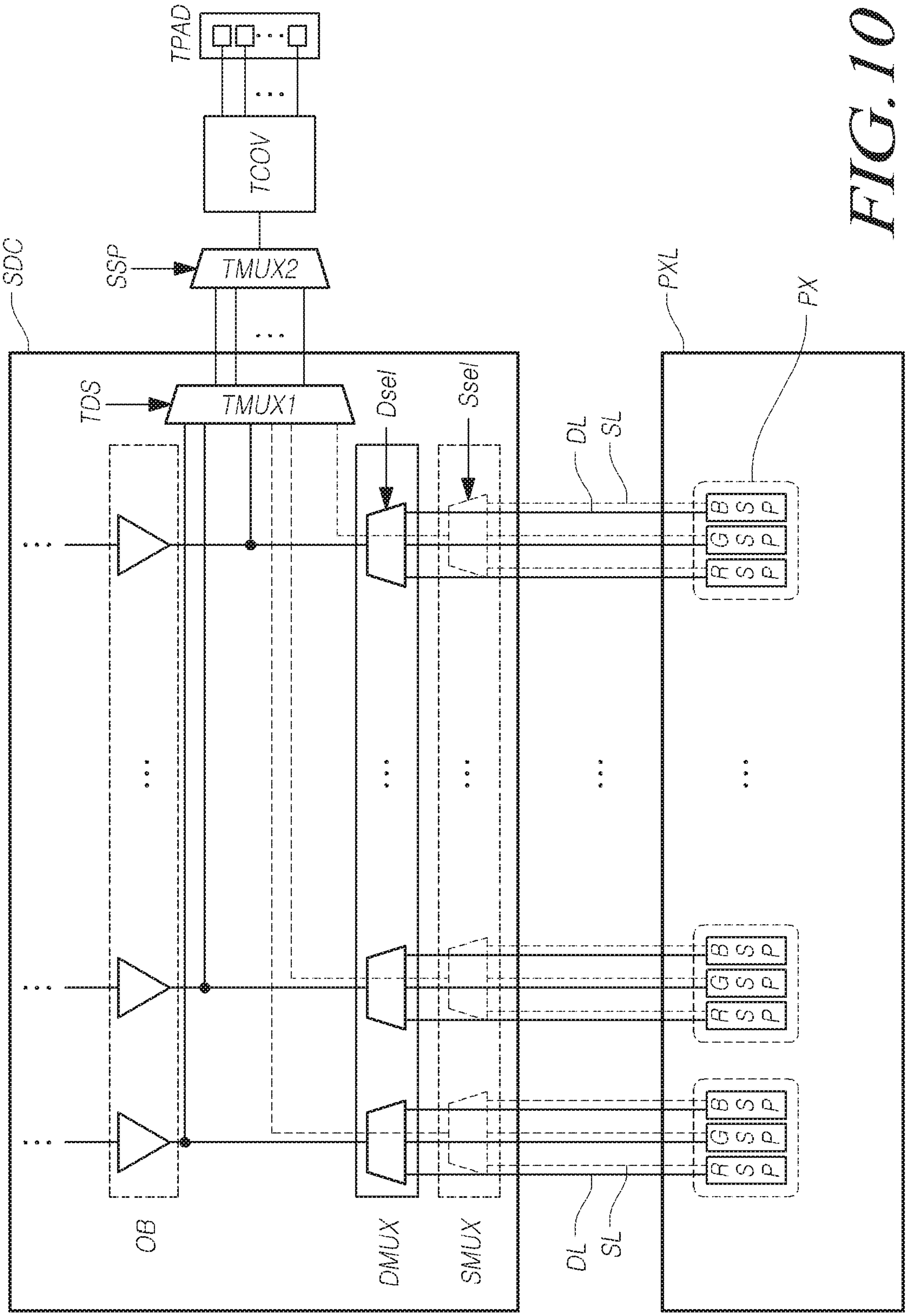

FIGS. 9 and 10 are views separately showing components for testing in the microdisplay device of FIG. 8.

In FIGS. 9 and 10, it is assumed that the microdisplay device 800 has a resolution of 1944*1224, that is, 1944*1224 pixels as in FIGS. 6 and 7.

Only one of two source driving circuits SDC and a test circuit connected thereto are shown.

The first test multiplexer TMUX1 may be arranged inside the source driving circuit SDC.

The first test multiplexer TMUX1 selects one of 972 data lines DL and 972 sensing lines SL in a test mode according to a test mode signal TDS, and electrically connects the selected one to the second test multiplexer TMUX2.

Next, when the first test multiplexer TMUX1 is not in the test mode, the first test multiplexer TMUX1 does not connect both the data lines DL and the sensing lines SL to the second test multiplexer TMUX2.

The second test multiplexer TMUX2 selects a designated number of lines among the 972 lines selected by the first test multiplexer TMUX1 according to the pixel selection signal SSP.

In FIG. 6, the second test multiplexer TMUX2 of the microdisplay device 200 that outputs an analog signal as a test signal selects 324 lines among the 972 lines. However, in the microdisplay device 800 that outputs test data, which is a digital signal, the second test multiplexer TMUX2 may select only one line.

This is because an analog-to-digital converter ADC included in the test converter TCOV can sample a signal output from the line selected by the second test multiplexer TMUX2 at a high speed and convert the sampled signal into test data.

Meanwhile, referring to FIG. 9, the test converter TCOV includes the analog-to-digital converter ADC. The test converter TCOV may further include a current-voltage converter I2V and a third test multiplexer TMUX3.

As described above, the analog-to-digital converter ADC may convert the signal output from the second test multiplexer TMUX2 into test data and output the converted result.

At this time, the analogue-to-digital converter ADC may be applied with data reference voltages Vt and Vb so that the test data can be transmitted to an external measurement device MSD having a large input parasitic capacitance at a high speed.

Here, the data reference voltages Vt and Vb are signals for increasing a swing width of the test data, which is a digital signal. The data reference voltages Vt and Vb may be generated in a power circuit PSC.

However, the data reference voltages Vt and Vb are voltages for allowing the external measurement device MSD to receive the test data at a high speed, and may have a different voltage level from that of the voltage generated by a typical power circuit PSC.

Accordingly, as shown in FIG. 9, the microdisplay device 800 according to the embodiments of the present disclosure includes a reference voltage pad unit RPAD for receiving the data reference voltages Vt and Vb to be supplied to the analog-to-digital converter ADC.

In FIG. 9, although the reference voltage pad unit RPAD is separately shown for the sake of convenience, the reference voltage pad unit RPAD may be included in the test pad unit TPAD because it includes two pads for receiving the two data reference voltages Vt and Vb.

Assuming that the analog-to-digital converter ADC outputs 10-bit test data, the test pad unit TPAD may include 12 pads including 10 test pads for outputting 10-bit test data and 2 pads for receiving the two data reference voltages Vt and Vb.

Accordingly, the test pad unit TPAD includes a significantly small number of pads as compared with the microdisplay device 200 of FIG. 2 to perform testing.

In the above description, the test converter TCOV includes one analog-to-digital converter ADC. However, the test converter TCOV may include two or more analog-to-digital converters ADC.

In this case, the number of test pads should be doubled. The two data reference voltages Vt and Vb may be used in common. That is, the reference voltage pad unit RPAD may include two pads regardless of the number of analog-to-digital converters ADC.

Meanwhile, as described above, current sensing may be performed in the sensing test mode. For example, there may be a case in which an amount of current supplied to the OLED needs to be measured.

Thereby, in the present disclosure, the test converter TCOV may further include a signal converter.

The signal converter includes a current-voltage converter I2V and a third test multiplexer TMUX3.

Since the signal converter includes the current-voltage converter I2V, a current signal output from the second test multiplexer TMUX2 may be converted into a voltage signal and provided to the analog-to-digital converter ADC.

The third test multiplexer TMUX3 allows voltage sensing and current sensing to be selectively performed.

The signal output from the second test multiplexer TMUX2 may be supplied to the third test multiplexer TMUX3 through the current-voltage converter I2V as shown in FIG. 9, or may be supplied directly to the third test multiplexer TMUX3 without passing through the current-voltage converter I2V.

The third test multiplexer TMUX3 may select the output of the second test multiplexer TMUX2 or the output of the current-voltage converter I2V depending on whether the sensing test mode is a voltage sensing mode or a current sensing mode, thereby supplying the selected output to the analog-to-digital converter ADC.

At this time, an input parasitic capacitance Cp of the analog-to-digital converter ADC is a predetermined pF or less which is significantly small. Therefore, minimal delay occurs when a signal of the third test multiplexer TMUX3 is transmitted to the analogue-to-digital converter ADC.

In addition, the analog-to-digital converter ADC may increase the driving capability of the test pad by using the data reference voltages Vt and Vb, so that the test data can be transmitted to the external measurement device MSD at a high speed.

Accordingly, even when the second test multiplexer TMUX2 sequentially selects one line among 972 lines and transmits the selected one line to the test converter TCOV, the transmission delay may be reduced, so that testing may be performed at a higher speed than the microdisplay device 200 of FIG. 2.

That is, the test cost can be reduced.

In addition, since the number of pads included in the test pad unit TPAD is greatly reduced, the size of the microdisplay device 800 may be reduced as compared with the microdisplay device 200.

Therefore, the yield can be increased and the manufacturing cost can be reduced.

Figure 11:
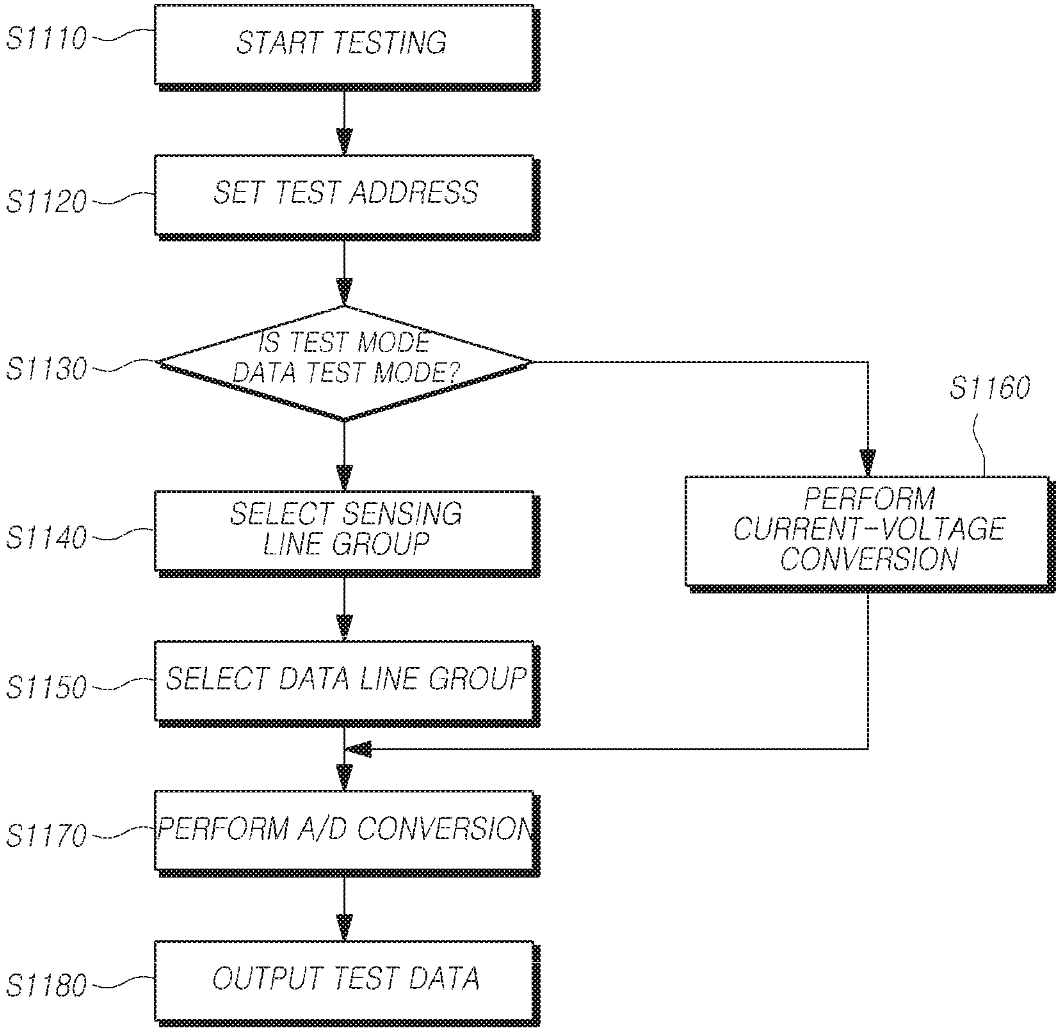
FIG. 11 shows a method of testing a microdisplay device according to embodiments of the present disclosure.

FIG. 11 shows a method of testing a microdisplay device according to embodiments of the present disclosure.

Referring to FIG. 11, in the method of testing a microdisplay device according to embodiments of the present disclosure, when an external measurement device MSD is electrically connected to a test pad of a test pad unit TPAD and data reference voltages Vt and Vb are supplied, a controller CONT outputs a test mode signal TDS for setting a test mode and starts testing in operation S1110.

At this time, in operation S1120, the controller CONT may set an address of a pixel (or a subpixel) required to be tested. That is, the position of the pixel (or the subpixel) required to be tested may be set.

Here, the address of the pixel (or the subpixel) designates a gate line GL in which a gate driving circuit GDC is to be driven and a data line in which a source driving circuit SDC is to be driven.

A second test multiplexer TMUX2 may select at least one line among a plurality of lines selected by a first test multiplexer TMUX1 according to the set test address.

However, when testing is performed on all of subpixels SP of a pixel array PXL, the test address is not set separately, and the second test multiplexer TMUX2 may sequentially select the plurality of lines selected by the first test multiplexer TMUX1.

Meanwhile, in operation 1130, a test circuit determines whether the test mode set by the test mode signal TDS is a data test mode.

When the test mode is a sensing test mode other than the data test mode, the first test multiplexer TMUX1 selects a plurality of sensing lines SL (that is, selects the sensing line group) among a plurality of data lines DL and the plurality of sensing lines SL and connects the selected lines to the second test multiplexer TMUX2 in operation S1140.

The second test multiplexer TMUX2 selects a predetermined number of sensing lines among the plurality of sensing lines SL according to the test address, and connects the selected sensing lines to a test converter TCOV.

A current-voltage converter I2V of the test converter TCOV converts a signal received through the second test multiplexer TMUX2 into a voltage signal to output the converted result in operation S1160, and the third test multiplexer TMUX3 selects the output of the second test multiplexer TMUX2 or the output of the current-voltage converter I2V to transmit the selected output to an analog-to-digital converter ADC.

The third test multiplexer TMUX3 selects one of the output of the second test multiplexer TMUX2 and the output of the current-voltage converter I2V depending on whether the third test multiplexer TMUX3 is in a voltage sensing mode or a current sensing mode.

Meanwhile, when the test mode is the data test mode, the first test multiplexer TMUX1 selects the plurality of data lines DL (that is, selects the data line group) and connects the selected data lines to the second test multiplexer TMUX2 in operation S1150.

Next, the second test multiplexer TMUX2 selects a predetermined number of data lines among the plurality of data lines DL according to the test address to connect the selected data lines to the test converter TCOV, and the third test multiplexer TMUX3 selects the output of the second test multiplexer TMUX2 to transmit the selected output to the analog-to-digital converter ADC.

The analog-to-digital converter ADC converts the received signal into a digital signal to acquire test data in operation S1170.

Next, the acquired test data is output to the external measurement device MSD through the test pad unit TPAD in operation S1180.

As a result, the method of testing the microdisplay device according to the embodiments of the present disclosure may convert the signal transmitted through the plurality of data lines DL or the plurality of sensing lines SL into the test data to output the converted result, and thereby the external measurement device may test the microdisplay device at a high speed.

Meanwhile, in the microdisplay device according to embodiments of the present disclosure, since the input/output pad unit IOPAD and the test pad unit TPAD correspond to a connection means for electrical connection to an external device, they are generally arranged in an area adjacent to each other, in terms of simplification or yield in the manufacturing process. In particular, since the the input/output pad unit IOPAD and the test pad unit TPAD are associated with a plurality of signal lines while including a driving voltage applied to the pixel array zone PAZ in which the pixel array PXL is arranged, they may be often arranged intensively on one side of the pixel array PXL, for example, on the left side thereof.

Accordingly, when a microdisplay device is configured with the structure shown in FIG. 8, the data line DL and the sensing line SL connected from the first test multiplexer TMUX1 arranged inside the source driving circuit SDC may extend from the left side of the pixel array PXL to the upper or lower side thereof, and then may be connected to the test pad unit on the left side of the pixel array PXL again via the right side of the pixel array PXL, so that the manufacturing process may become complicated and the yield may be reduced.

In particular, when the second test multiplexer TMUX2 is configured to select one line from 972 data lines DL or sensing lines SL connected from the first test multiplexer TMUX1, a test time may be excessively increased due to the processing capacity of the analog-to-digital converter ADC located in the test converter TCOV.

In consideration of such efficiency, the microdisplay device according to the present disclosure is characterized in that the second test multiplexer TMUX2 and the test converter TCOV are arranged adjacent to the first test multiplexer TMUX1 or the source driving circuit SDC and the output of the second test multiplexer TMUX2 is configured as multi-lines instead of one line.

Figure 12:
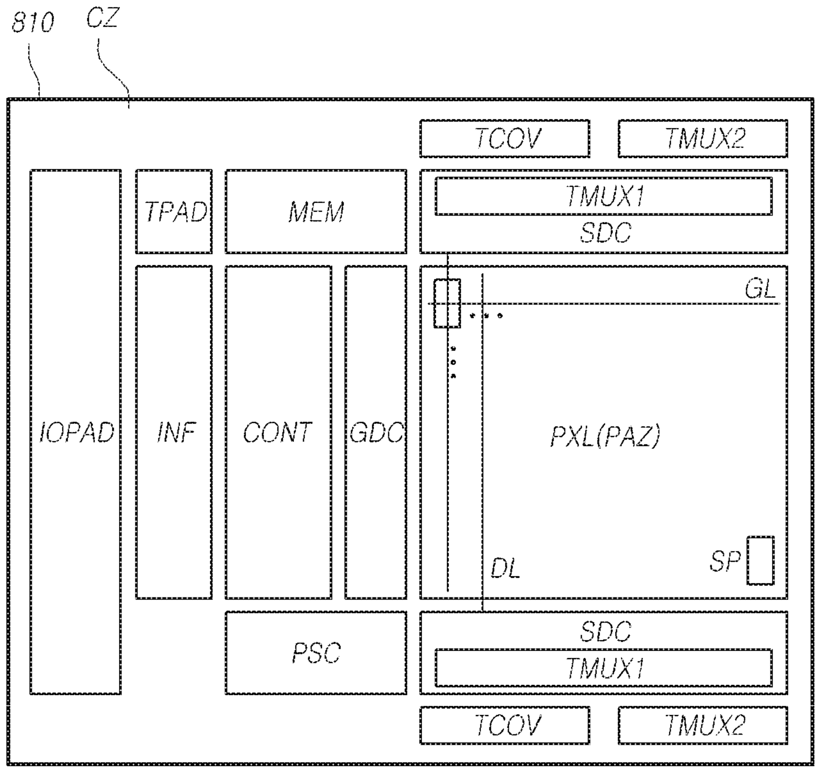
FIG. 12 is a schematic system configuration diagram of a microdisplay device according to other embodiments of the present disclosure.

FIG. 12 is a schematic system configuration diagram of a microdisplay device according to other embodiments of the present disclosure.

Referring to FIG. 12, in the microdisplay device 800 of FIG. 12, the pixel array PXL and the driving circuits may be configured in the same manner and may be arranged at the same position on the silicon substrate 810, as compared with the microdisplay device 800 of FIG. 8.

That is, at least one source driving circuit SDC, at least one gate driving circuit GDC, a controller CONT, a memory MEM, a power circuit PSC, an interface INF, and an input/output pad unit IOPAD may respectively perform the same operations as those in the microdisplay device 800 of FIG. 8, and may be respectively arranged at the same positions as those in the microdisplay device 800 of FIG. 8.

A test circuit of the microdisplay device 800 of FIG. 12 also includes a first test multiplexer TMUX1, a second test multiplexer TMUX2, a test pad unit TPAD, and a test converter TCOV, in the same manner as that in the test circuit of FIG. 8.

However, unlike the case of FIG. 8, the second test multiplexer TMUX2 and the test converter TCOV may be arranged adjacent to the source driving circuit SDC, and the second test multiplexer TMUX2 is configured to generate a multi-line output.

At this time, the second test multiplexer TMUX2 and the test converter TCOV may be arranged separately into an upper portion and a lower portion. Specifically, the upper second test multiplexer TMUX2 and the upper test converter TCOV may be arranged side by side adjacent to the upper source driving circuit SDC of the pixel array PXL, and the lower second test multiplexer TMUX2 and the lower test converter TCOV may be arranged side by side adjacent to the lower source driving circuit SDC of the pixel array PXL. In particular, the upper second test multiplexer TMUX2 and the upper test converter TCOV may be arranged above the upper source driving circuit SDC, and may be connected to the even number of data lines DL and sensing lines SL. In addition, the lower second test multiplexer TMUX2 and the lower test converter TCOV may be arranged below the lower source driving circuit SDC, and may be connected to the odd number of data lines DL and sensing lines SL.

Meanwhile, the second test multiplexer TMUX2 may be configured to have a plurality of multi-line outputs. For example, in the case of FIG. 8, the second test multiplexer TMUX2 is configured to have a multiplexing function of 972:1. However, considering the processing speed of the analog-to-digital converter ADC, the second test multiplexer TMUX2 is configured to have a multiplexing function of 6:1, so that the output line of the second test multiplexer TMUX2 can be 162 lines. As a result, the analog-to-digital converter ADC may convert a 162-line signal into, for example, an 8-bit or 10-bit digital serial signal Dout and may output the converted result to the test pad unit TPAD.

Thus, the test pad unit TPAD can output the test data Dout to a measurement device MSD using the same number of test pads as the number of bits of the test data.

In FIG. 8, since the second test multiplexer TMUX2 and the test converter TCOV are arranged on the right side of the pixel array PXL spaced apart from the source driving circuit SDC, a connection route of the data line DL and the sensing line SL becomes long, and long time according to the test of the microdisplay device is required.

However, in FIG. 12, the second test multiplexer TMUX2 and the test converter TCOV are arranged in the upper or lower portion adjacent to the source driving circuit SDC, thereby reducing the lengths of the data line DL and the sensing line SL for testing and improving the yield. The second test multiplexer TMUX2 may be configured to generate a multi-line output, and the analog-to-digital converter ADC may process the generated multi-line output through a serializer, thereby significantly reducing the test time.

At this time, the serializer may be connected to an output terminal of the analog-to-digital converter ADC, and may include a latch circuit for storing a plurality of input signals and a flip-flop for sequentially outputting the plurality of input signals.

Meanwhile, the second test multiplexer TMUX2 and the test converter TCOV may be arranged adjacent to the source driving circuit SDC, but may be arranged in the form of a module together with the first test multiplexer TMUX1 inside the source driving circuit SDC.

Figure 13:
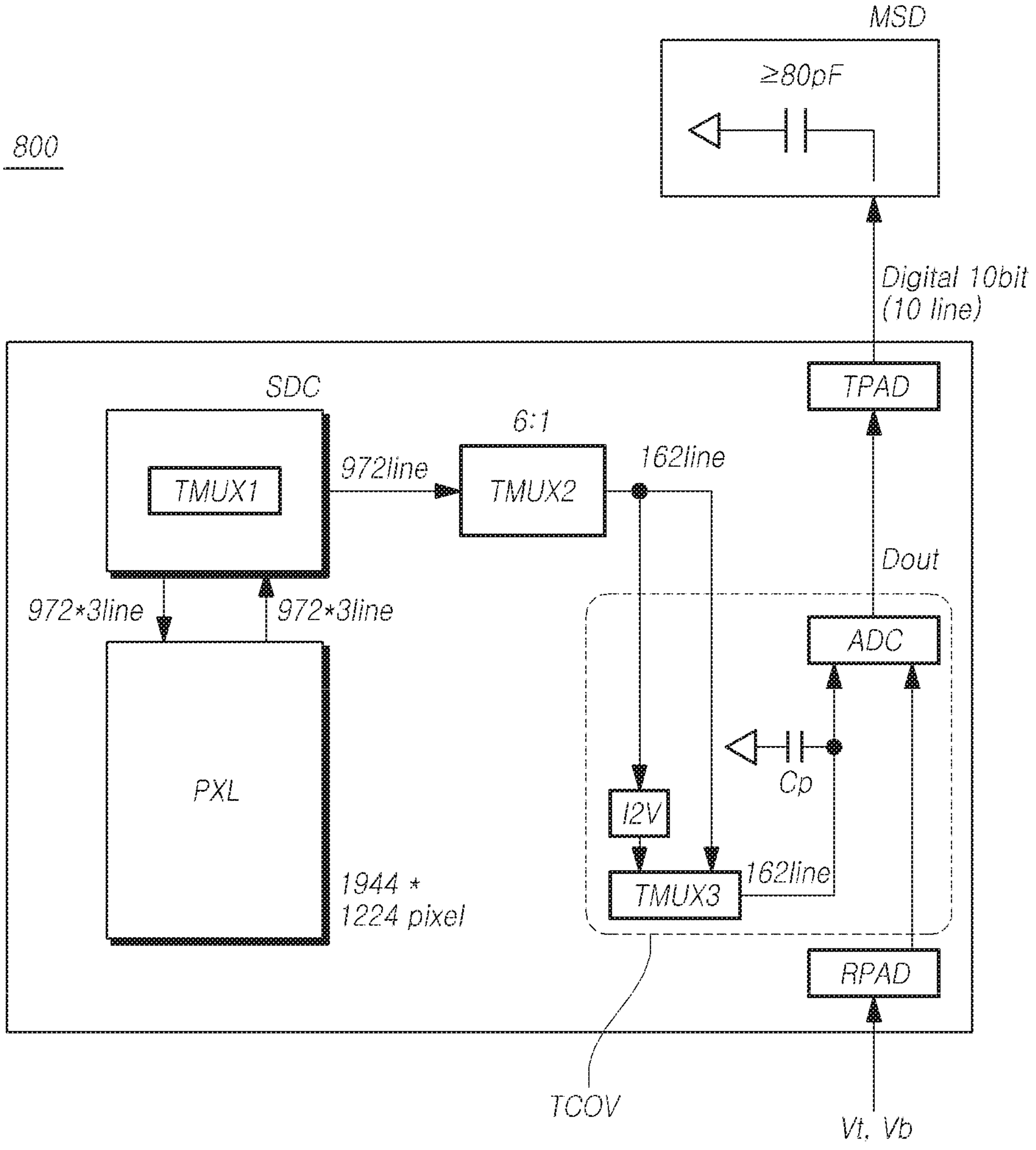
FIG. 13 is a view separately showing a component for testing in the microdisplay device of FIG. 12.

FIG. 13 is a view separately showing a component for testing in the microdisplay device of FIG. 12.

In FIG. 13, in the same manner as that in FIG. 9, description will be made assuming a case in which the microdisplay device 800 has a resolution of 1944*1224, that is, includes 1944*1224 pixels.

Only one source driving circuit of two source driving circuits SDC and a test circuit connected thereto are shown. Here, the first test multiplexer TMUX1 may be arranged inside the source driving circuit SDC. The first test multiplexer TMUX1 may select one of 972 data lines DL and 972 sensing lines SL in a test mode according to a test mode signal TDS and may electrically connect the selected line to the second test multiplexer TMUX2. When the corresponding mode is not the test mode, the first test multiplexer TMUX1 may not connect all of the data lines DL and the sensing lines SL to the second test multiplexer TMUX2.

When the second test multiplexer TMUX2 is composed of a multiplexer of 6:1, 162 designated lines among the 972 lines selected by the first test multiplexer TMUX1 are selected according to a pixel selection signal SSP. The selected 162 lines are applied to the test converter TCOV.

The test converter TCOV includes an analog-to-digital converter ADC. In addition, the test converter TCOV may further include a current-voltage converter I2V and a third test multiplexer TMUX3.

The analog-to-digital converter ADC may convert a signal output from the second test multiplexer TMUX2 into test data Dout and may output the converted result, as described above. The analog-to-digital converter ADC may be applied with a data reference voltage Vt or Vb, so that the test data Dout can be transmitted to an external measurement device MSD having a large input parasitic capacitance at a high speed.

Here, the data reference voltage Vt or Vb may be a signal for increasing a swing width of test data, which is a digital signal. The data reference voltage Vt or Vb may be generated by a power circuit PSC. However, the data reference voltage Vt or Vb is a voltage for allowing the external measurement device MSD to receive the test data Dout at a high speed, and a voltage and a voltage level generated by a normal power circuit PSC may be different.

Thus, as shown in FIG. 13, the microdisplay device 800 according to embodiments of the present disclosure may further include a reference voltage pad unit RPAD configured to receive the data reference voltage Vt or Vb to be supplied to the analog-to-digital converter ADC.

Although the reference voltage pad unit RPAD is separately shown in FIG. 13 for the convenience of description, the reference voltage pad unit RPAD includes two pads for receiving two data reference voltages Vt and Vb and thereby may be included in the test pad unit TPAD.

Assuming that the analog-to-digital converter ADC outputs 10-bit test data Dout, the test pad unit TPAD includes a total of 12 pads having 10 test pads for outputting the 10-bit test data Dout and 2 pads for receiving the two data reference voltages Vt and Vb.

In the above description, the test converter TCOV includes one analog-to-digital converter ADC, but the test converter TCOV may include two or more analog-to-digital converters ADCs.

In this case, the number of test pads should be doubled, and the two data reference voltages Vt and Vb may be used in common. That is, the reference voltage pad unit RPAD may include two pads irrespective of the number of the analog-to-digital converters ADCs.

Meanwhile, as described above, a case in which current sensing is performed in the sensing test mode may occur. For example, an amount of current supplied to an OLED may need to be measured.

Thus, in the present disclosure, the test converter TCOV may further include a signal converter. The signal converter includes a current-voltage converter I2V and a third test multiplexer TMUX3.

The signal converter includes the current-voltage converter I2V, so that a current signal output from the second test multiplexer TMUX2 may be converted into a voltage signal and the voltage signal may be provided to the analog-to-digital converter ADC.

The third test multiplexer TMUX3 may enable voltage sensing and current sensing to be selectively performed.

The signal output from the second test multiplexer TMUX2 may be supplied to the third test multiplexer TMUX3 through the current-voltage converter I2V as shown in FIG. 13, or may be supplied directly to the third test multiplexer TMUX3 without going through the current-voltage converter I2V.

Accordingly, the third test multiplexer TMUX3 selects the output of the second test multiplexer TMUX2 of the 162 lines according to whether the sensing test mode is a voltage sensing mode or a current sensing mode, or selects the output of the current-voltage converter I2V of the 162 lines to supply the selected output to the analog-to-digital converter ADC.

At this time, an input parasitic capacitance Cp of the analog-to-digital converter ADC is very small, which is equal to or less than several pF. Therefore, in a process in which the output from the third test multiplexer TMUX3 is transmitted to the analog-to-digital converter ADC, there is little delay.

In addition, the analog-to-digital converter ADC can increase driving capability of the test pad by using the data reference voltages Vt and Vb, so that the test data Dout can be transmitted to the external measurement device MSD at a high speed.

In addition, although not shown in the drawing, the analog-to-digital converter ADC may sequentially output signals applied through the 162 lines as 10-bit test data Dout through the serializer. The serializer may include a latch circuit and a flip-flop, and may be placed at an output terminal of the analog-to-digital converter ADC.

In addition, a filter for removing noise such as a glitch and a one shot generator for generating a single clock may be added between the analog-to-digital converter ADC and the serializer.

Accordingly, when the second test multiplexer TMUX2 composed of the multiplexer of 6:1 sequentially selects 162 lines from 972 lines and transmits the selected lines to the test converter TCOV, the analog-to-digital converter ADC may output the test data at a high speed, thereby reducing the test time while maintaining the number of test pads and reducing the testing cost. As a result, it is possible to increase the yield of the manufacturing process and reduce the manufacturing cost.

Meanwhile, the analog-to-digital converter ADC can be driven using two data reference voltages Vt and Vb, but may be driven by a single slope generator generating a data reference voltage that increases in a stepwise manner. The single slope generator generates the data reference voltage in such a manner that the data reference voltage increases from a zero level V0 to the final level in a stepwise manner. For example, in a 256-bit data reference voltage generating circuit, a pulse signal increases from a zero voltage V0 to a voltage V255 in a stepwise manner. Accordingly, when the data reference voltage exceeds an input voltage of a certain level while the data reference voltage increases in a stepwise manner, an output signal or a specific pulse signal may be generated at a time point corresponding to the data reference voltage of a level exceeding the input voltage. This allows the operation of the analog-to-digital converter ADC to be performed at a specific time point.

In this manner, when the single slope generator generating the data reference voltage so that the data reference voltage increases in a stepwise manner is used, it is beneficial that the pixel array PXL and the areas of various driving circuits arranged around the pixel array PXL are arranged so as not to be expanded.

At this time, the microdisplay device 800 of the present disclosure may include a margin area MA that prevents damage to the pixel array PXL and uniformizes the characteristics of a plurality of gate lines GL and a plurality of data lines DL on the pixel array PXL, that is, the characteristics of the subpixels SP as uniform as possible.

Since the second test multiplexer TMUX2 and the test converter TCOV are arranged adjacent to the same area as the source driving circuit SDC as described above, the single slope generator may be formed on the right side of the pixel array PXL, that is, in an area in which a plurality of signal lines or driving circuits are not arranged.

Figure 14:
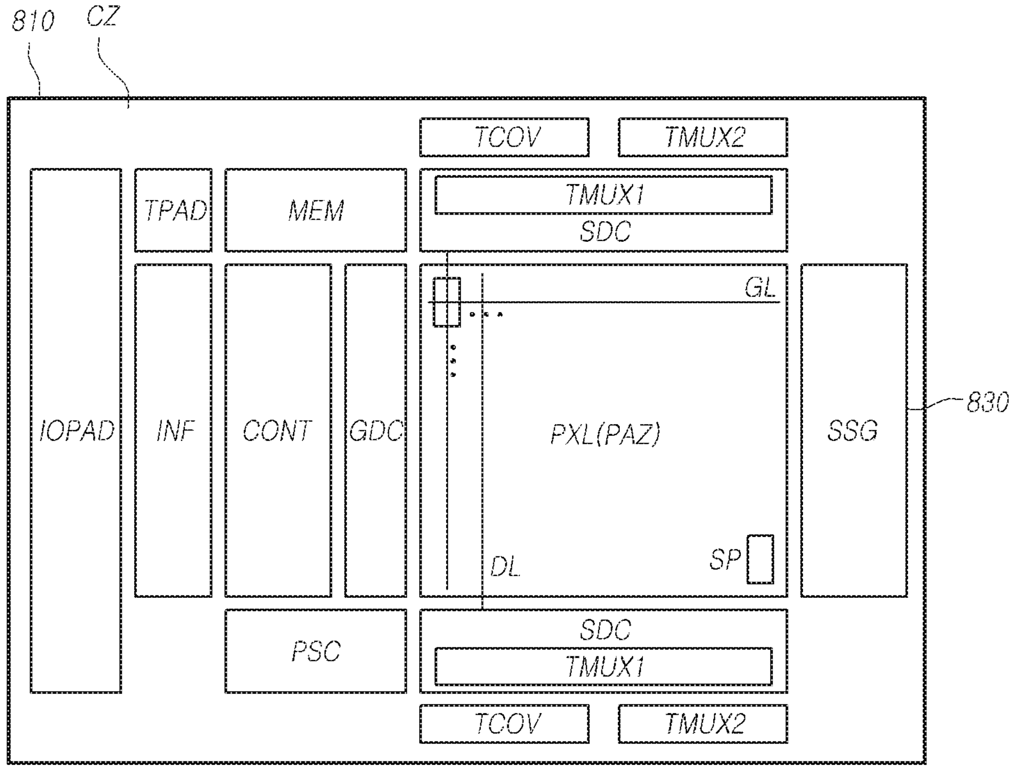
FIG. 14 is a schematic system configuration diagram of a microdisplay device according to other embodiments of the present disclosure.
Figure 15:
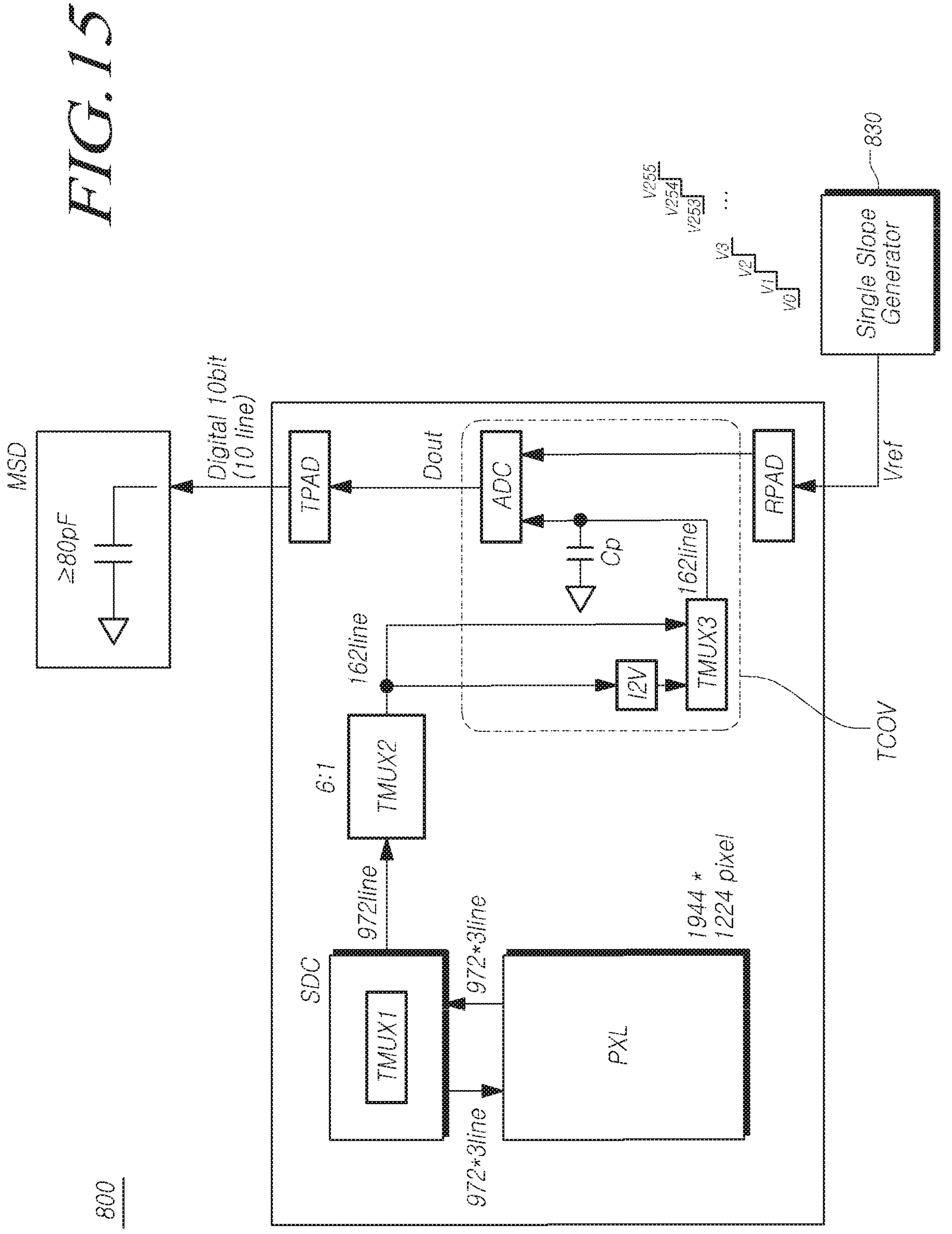
FIG. 15 is a view separately showing a component for testing in the microdisplay device of FIG. 14.

FIG. 14 is a schematic system configuration diagram of a microdisplay device according to other embodiments of the present disclosure, and FIG. 15 is a view separately showing a component for testing in the microdisplay device of FIG. 14.

Referring to FIGS. 14 and 15, in the microdisplay device 800, the pixel array PXL and the driving circuits may be configured in the same manner and arranged at the same position on the silicon substrate 810, compared to the microdisplay device 800 of FIG. 12.

That is, at least one source driving circuit SDC, at least one gate driving circuit GDC, a controller CONT, a memory MEM, a power circuit PSC, an interface INF, and an input/output pad unit IOPAD may respectively perform the same operations as those in the microdisplay device 800 of FIG. 12, and may be respectively arranged at the same positions as those in the microdisplay device 800 of FIG. 12.

A test circuit of the microdisplay device 800 of FIG. 14 also includes a first test multiplexer TMUX1, a second test multiplexer TMUX2, a test pad unit TPAD, and a test converter TCOV in the same manner as that in the test circuit of FIG. 12, and they may be respectively arranged at the same positions. In particular, the second test multiplexer TMUX2 and the test converter TCOV may be arranged adjacent to the source driving circuit SDC in the same manner as that in FIG. 12, and the second test multiplexer TMUX2 may be configured to generate a multi-line output.

However, unlike the case of FIG. 12, a single slope generator SSG 830 for generating a stepwise data reference voltage Vref is arranged in the margin area MA of the pixel array PXL. Accordingly, the second test multiplexer TMUX2 and the test converter TCOV may be arranged adjacent to the same area as the source driving circuit SDC, and the single slope generator 830 may be arranged in the margin area MA, and thereby the microdisplay device 800 may have the same transverse width.

Therefore, the size of the microdisplay device 800 of FIG. 14 can be reduced as a whole compared to the microdisplay device 200 of FIG. 2 to increase the yield, thereby reducing the manufacturing cost. In addition, even when the single slope generator 830 for generating the stepwise data reference voltage Vref is used, the yield according to the manufacturing process of the display device can be improved, and manufacturing cost, testing cost, and the test time can be reduced.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary embodiments of the present disclosure have been described for the sake of brevity and clarity. For example, one embodiment is described with respect a microdisplay device, but the teachings and structure disclosure herein are not limited solely to a microdisplay device and can be applied to display device. The scope of the present disclosure shall be construed on the basis of the accompanying claims in such a manner that all of the technical ideas included within the scope equivalent to the claims belong to the present disclosure.

The various embodiments described above can be combined to provide further embodiments. Aspects of the embodiments can be modified, if necessary to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the specific embodiments.

What is claimed is:

1. A display device, comprising:

a silicon substrate having a plurality of gate lines, a plurality of data lines, a plurality of sensing lines, and a pixel array on which a plurality of subpixels are arranged;

a test circuit arranged on the silicon substrate, the test circuit configured to select at least one line of the plurality of data lines or the plurality of sensing lines, to convert a signal transmitted through the selected line into a digital signal, and to output test data; and a test pad unit configured to output the test data to a circuit outside the silicon substrate, wherein the test circuit comprises a first test multiplexer configured to select one of the plurality of data lines or the plurality of sensing lines according to a test mode, a second test multiplexer configured to select at least one line of the plurality of data lines or of the plurality of sensing lines selected by the first test multiplexer, and a test converter configured to convert a signal received through the line selected by the second test multiplexer into a digital signal and to output the test data having a predetermined number of bits.

2. The display device of claim 1, wherein the second test multiplexer sequentially changes and selects at least one line of the plurality of data lines or plurality of sensing lines selected by the first test multiplexer.

3. The display device of claim 1, wherein the test converter further comprises:

an analog-to-digital converter; and a signal converter configured to be arranged between the second test multiplexer and the analog-to-digital converter and to convert, when a signal output from the second test multiplexer is a current signal, the current signal into a voltage signal to output the converted result to the analog-to-digital converter.

4. The display device of claim 3, wherein the signal converter comprises:

a current-voltage converter configured to detect a current of the signal output from the second test multiplexer and to convert the detected current into a corresponding voltage signal; and a third test multiplexer configured to output, when a mode designated by a test mode signal is a sensing test mode, an output of the current-voltage converter to the analog-to-digital converter, and to output, when the mode designated by the test mode signal is a data test mode, an output of the second test multiplexer to the analog-to-digital converter.

5. The display device of claim 3, wherein the test pad unit comprises:

the same number of test pads as the number of bits of the test data; and a reference pad configured to be applied with a data reference voltage of the analog-to-digital converter from an external device.

6. The display device of claim 5, wherein the data reference voltage is a stepwisely increasing voltage generated by a single slope generator.

7. The display device of claim 6, wherein the single slope generator is arranged in a margin area in which at least one gate driving circuit and at least one source driving circuit in a driving circuit included in the display device are not located.

8. The display device of claim 1, further comprising:

a driving circuit configured to be arranged on a circuit zone;

wherein the driving circuit comprises:

at least one gate driving circuit configured to be arranged in a first direction in which the plurality of gate lines of the pixel array extend and to drive the plurality of gate lines;

at least one source driving circuit configured to be arranged in a second direction in which the plurality of data lines of the pixel array extend and to drive the plurality of data lines; and a controller configured to control the at least one gate driving circuit, the at least one source driving circuit, and the test circuit.

9. The display device of claim 8, wherein the test circuit is arranged in a margin area in which the at least one gate driving circuit and the at least one source driving circuit are not located in a periphery of the pixel array.

10. The display device of claim 8, further comprising:

an input/output pad unit configured to receive input image data from an external device and to transmit the received input image data to the controller, wherein the test pad unit is arranged adjacent to the input/output pad unit.

11. The display device of claim 8, wherein the first test multiplexer is arranged inside the at least one source driving circuit.

12. The display device of claim 1, wherein the second test multiplexer and the test converter are arranged adjacent to the first test multiplexer.

13. A test circuit of a microdisplay device which is arranged on a silicon substrate, wherein the test circuit selects at least one line of a plurality of data lines or a plurality of sensing lines arranged on a pixel array, converts a signal transmitted through the selected line into a digital signal to acquire test data, and outputs the acquired test data through a test pad unit arranged on the silicon substrate, wherein the test circuit comprises a first test multiplexer configured to select one line of the plurality of data lines or the plurality of sensing lines according to a test mode, a second test multiplexer configured to select at least one line of the plurality of data lines or of the plurality of sensing lines selected by the first test multiplexer, and a test converter configured to convert a signal received through the line selected by the second test multiplexer into a digital signal and to output the test data having a predetermined number of bits.

14. The test circuit of claim 13, wherein the second test multiplexer and the test converter are arranged adjacent to the first test multiplexer.

15. The test circuit of claim 13, wherein the test pad unit comprises:

the same number of test pads as the number of bits of the test data, and a reference pad configured to be applied with a data reference voltage from a single slope generator, wherein the single slope generator is arranged in a margin area.

16. A test circuit of a display device which is arranged on a silicon substrate, the test circuit being configured to select at least one line of a plurality of data lines or at least one line a plurality of sensing lines arranged on a pixel array, convert a signal transmitted through the selected line into a digital signal to acquire test data, and output the acquired test data through a test pad unit arranged on the silicon substrate, the test circuit comprising:

a first test multiplexer configured to select at least one line of the plurality of data lines or at least one line of the plurality of sensing lines according to a test mode;

a second test multiplexer configured to select only one line of either the selected line of the plurality of data lines or the selected line of the plurality of sensing lines selected by the first test multiplexer; and a test converter configured to convert a signal received through the line selected by the second test multiplexer into a digital signal, and to output the test data having a predetermined number of bits.

17. The test circuit of claim 16 wherein the second test multiplexer and the test converter are arranged adjacent to the first test multiplexer on the same silicon substrate.

* * * * *